US012804193B2

(12) United States Patent
Zhang et al.

(10) Patent No.: US 12,804,193 B2
(45) Date of Patent: Nov. 17, 2026

(54) BI-DIRECTIONAL OPTICAL FLOW IN VIDEO CODING

(71) Applicant: QUALCOMM Incorporated, San Diego, CA (US)

(72) Inventors: Zhi Zhang, Munich (DE); Han Huang, San Diego, CA (US); Chun-Chi Chen, San Diego, CA (US); Yan Zhang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 855 days.

(21) Appl. No.: 17/645,233

(22) Filed: Dec. 20, 2021

(65) Prior Publication Data

US 2022/0201313 A1 Jun. 23, 2022

Related U.S. Application Data

(60) Provisional application No. 63/129,190, filed on Dec. 22, 2020.

(51) Int. Cl.
*H04N 19/537* (2014.01)
*H04N 19/119* (2014.01)
(Continued)

(52) U.S. Cl.
CPC ......... *H04N 19/537* (2014.11); *H04N 19/119* (2014.11); *H04N 19/132* (2014.11);
(Continued)

(58) Field of Classification Search
None
See application file for complete search history.

(56) References Cited

U.S. PATENT DOCUMENTS 10,523,964 B2 12/2019 Chuang et al.
10,904,565 B2 1/2021 Chuang et al.
(Continued)

FOREIGN PATENT DOCUMENTS

CN 110832858 A 2/2020
CN 111885387 A 11/2020
(Continued)

OTHER PUBLICATIONS

Bossen F., "Merge branch 'CheckingNoOutputBeforeRecoveryPicFlagBeforeNotOutputtingDPBPic' into 'master'", VVC VTM Reference Software, Retrieved on Apr. 20, 2022, pp. 1-3, URL: https://vcgit.hhi.fraunhofer.de/jvet/VVCSoftware_VTM.
(Continued)

*Primary Examiner* — Mohammed Jebari
(74) *Attorney, Agent, or Firm* — Shumaker & Sieffert, P.A.

(57) ABSTRACT

A method of decoding video data includes determining that bi-directional optical flow (BDOF) is enabled for a block of the video data; dividing the block into a plurality of sub-blocks based on the determination that BDOF is enabled for the block, determining, for each sub-block of one or more sub-blocks of the plurality of sub-blocks, respective distortion values, determining that one of per-pixel BDOF is performed or BDOF is bypassed for each sub-block of the one or more sub-blocks of the plurality of sub-blocks based on the respective distortion values, determining prediction samples for each sub-block of the one or more sub-blocks based on the determination of per-pixel BDOF being performed or BDOF being bypassed, and reconstructing the block based on the prediction samples.

20 Claims, 16 Drawing Sheets

(51) Int. Cl.

| | |
|---|---|
| ***H04N 19/132*** | (2014.01) |
| ***H04N 19/137*** | (2014.01) |
| ***H04N 19/154*** | (2014.01) |
| ***H04N 19/176*** | (2014.01) |
| ***H04N 19/46*** | (2014.01) |
| ***H04N 19/523*** | (2014.01) |
| ***H04N 19/557*** | (2014.01) |
| ***H04N 19/567*** | (2014.01) |
| ***H04N 19/577*** | (2014.01) |

(52) U.S. Cl.

CPC ......... *H04N 19/137* (2014.11); *H04N 19/154* (2014.11); *H04N 19/176* (2014.11); *H04N 19/46* (2014.11); *H04N 19/523* (2014.11); *H04N 19/557* (2014.11); *H04N 19/567* (2014.11); *H04N 19/577* (2014.11)

(56) References Cited

U.S. PATENT DOCUMENTS

| | | | | |
|---|---|---|---|---|
| 2018/0199057 | A1* | 7/2018 | Chuang | H04N 19/573 |
| 2019/0045215 | A1* | 2/2019 | Chen | H04N 19/577 |
| 2019/0320199 | A1* | 10/2019 | Chen | H04N 19/00 |
| 2020/0154127 | A1* | 5/2020 | Lee | H04N 19/577 |
| 2020/0221122 | A1* | 7/2020 | Ye | H04N 19/176 |
| 2020/0236362 | A1* | 7/2020 | Lee | H04N 19/176 |
| 2020/0296416 | A1* | 9/2020 | Liao | H04N 19/139 |
| 2020/0314444 | A1* | 10/2020 | Lee | H04N 19/105 |
| 2020/0404284 | A1* | 12/2020 | Chen | H04N 19/52 |
| 2021/0195227 | A1* | 6/2021 | Lee | H04N 19/523 |
| 2021/0227211 | A1* | 7/2021 | Liu | H04N 19/59 |
| 2022/0046249 | A1* | 2/2022 | Xiu | H04N 19/105 |
| 2022/0060735 | A1* | 2/2022 | Chen | H04N 19/523 |
| 2022/0132138 | A1* | 4/2022 | Xiu | H04N 19/159 |
| 2022/0182633 | A1* | 6/2022 | Lin | H04N 19/186 |
| 2022/0264086 | A1* | 8/2022 | Zhang | H04N 19/105 |
| 2022/0337866 | A1* | 10/2022 | Wan | H04N 19/52 |
| 2023/0044502 | A1* | 2/2023 | Li | H04N 19/139 |

FOREIGN PATENT DOCUMENTS

| | | | | |
|---|---|---|---|---|
| JP | 2020202454 | A | 12/2020 | |
| WO | 2018169989 | A1 | 9/2018 | |
| WO | 2018237303 | A1 | 12/2018 | |
| WO | 2019010156 | A1 | 1/2019 | |
| WO | WO-2020143838 | A1 * | 7/2020 | H04N 19/52 |
| WO | WO-2020184715 | A1 * | 9/2020 | |
| WO | 2020236400 | A1 | 11/2020 | |
| WO | WO-2021188707 | A1 * | 9/2021 | H04N 19/52 |

OTHER PUBLICATIONS

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

Bross B., et al., "Versatile Video Coding Editorial Refinements on Draft 10", JVET-T2001-v2, 20. JVET Meeting, Oct. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515, XP030293334, Retrieved from the Internet: URL: https://jvet-experts.org/doc_end_user/documents/20_Teleconference/wg11/JVET-T2001-v2.zip, JVET-T2001-v2.docx, [retrieved on Nov. 24, 2020] cited in the application section 9.3.3.2.

Chang Y-J., et al., "Compression Efficiency Methods Beyond VVC", Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, 2021 , Jan. 11, 2021-Jan. 15, 2021, Retrieved from the Internet: URL: https://dms.mpeg.expert/doc_end_user/documents/133_Teleconference/wg11/m55890-JVET-U0100-v1-JVET-U0100.zip, Paragraph [04.2], Section 3.4.2, figure 5, section 3.6, cited in the application, section 5 Adaptive loop filter. 13 pages.

Chang Y-J., et al., "EE2: Tests of Compression Efficiency Methods Beyond VVC", JVET-V0120-v2, Joint Video Experts Team (JVET) of ITU-T SG 16 WP 3 and ISO/IEC JTC 1/SC 29, 22nd Meeting, by Teleconference, Apr. 20-28, 2021, pp. 1-31.

Chen J., et al., "Algorithm Description for Versatile Video Coding and Test Model 11 (VTM 11)", 20. JVET Meeting, Teleconference, (The Joint Videoexploration Team of ISO/IEC JTC1/SC29/WG11AND ITU-T SG.16), No. JVET-T2002-v1, 132. MPEG Meeting, Oct. 12, 2020-Oct. 16, 2020, No. m55626, Dec. 14, 2020 (Dec. 14, 2020), Retrieved from the Internet: URL: https://jvet-experts.org/doc_end_user/documents/20_Teleconference/wg11/JVET-T2002-v4.zip JVET-T2002-v1.docx [retrieved on Dec. 14, 2020] Section 3.4.9, Section 3.7.1, Adaptive Loop Filter. 102 pp.

Chen J., et al., "Algorithm Description of Joint Exploration Test Model 7 (JEM7)", 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. G1001_v1, JVET-G1001, 7th Meeting, Jul. 13, 2017-Jul. 21, 2017, Torino, IT, Aug. 19, 2017 (Aug. 19, 2017), Retrieved from the Internet: URL: https://phenix.int-evry.fr/jvet/doc_end_user/documents/7_Torino/wg11/JVET-G1001-v1.zip JVET-G1001-v1.docx, 48 pages.

Chuang, H-C., et al., "EE3-Related: A Block-Based Design for Bi-Directional Optical Flow (BIO)", 6. JVET Meeting, Mar. 31, 2017-Apr. 7, 2017; Hobart; (The Joint Video Exploration Team of ISO/IEC JTC1/SC29/WG11 and ITU-T SG. 16), URL: http://phenix.int-evry.fr/jvet/, No. JVET-F0022, Mar. 15, 2017 (Mar. 15, 2017), XP030150669, pp. 1-3, Retrieved from the Internet: URL:http://phenix.int-evry.fr/jvet/doc_end_user/documents/6_Hobart/wg11/JVET-F0022-v1.zip JVET-F0022.doc [retrieved on Mar. 15, 2017] the whole document.

International Search Report and Written Opinion—PCT/US2021/064600—ISA/EPO—Mar. 29, 2022 (17 pp).

ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Taiwan Search Report—TW110147992—TIPO—May 9, 2025, 1 page.

Bross B., et al., "Versatile Video Coding Editorial Refinements on Draft 10", Joint Video Experts Team (JVET) of ITU-T SG16 WP 3 and ISO/IEC JTC 1/SC29, JVET-T2001-V2, 20th Meeting, by teleconference, Nov. 24, 2020, 22 Pages, pp. 240-245, 263-268, 294-298, 312-313.

Chang Y-J., et al., "Compression Efficiency Methods Beyond WVC", Joint Video Experts Team (JVET) of ITU-T SG16 WP 3 and ISO/IEC JTC 1/SC29, JVET-U0100, 21st Meeting, by teleconference, Jan. 6, 2021-Jan. 15, 2021, Dec. 2020, pp. 1-13.

Kondo K., et al., "Non-CE 9: On Early Termination for BDOF", Joint Video Experts Team (JVET) of ITU-T SG16 WP 3 and ISO/IEC JTC 1/SC 29/WG 11, JVET-M0073-r2, 13th Meeting: Marrakech, MA, Jan. 9, 2019-Jan. 18, 2019, Jan. 2019, pp. 1-5.

* cited by examiner

BI-DIRECTIONAL OPTICAL FLOW IN VIDEO CODING

This application claims the benefit of U.S. Provisional Application No. 63/129,190, filed Dec. 22, 2020, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for decoder-side motion vector derivation (e.g., template matching, bilateral matching, decoder-side motion vector (MV) refinement, and/or bi-directional optical flow (BDOF)). The techniques of this disclosure may be applied to any of the existing video codecs, such as HEVC (High Efficiency Video Coding), VVC (Versatile Video Coding), Essential Video Coding (EVC) or be an efficient coding tool in any future video coding standards.

In one or more examples, for BDOF, a video encoder and a video decoder (e.g., a video coder) may be configured to selectively determine whether per-pixel BDOF is performed for sub-blocks of a block, or whether BDOF is bypassed. That is, the video coder may select one of per-pixel BDOF or that per-pixel BDOF (or BDOF generally) is bypassed. In this way, the example techniques may promote selection between coding modes that may provide better coding performance, such as when combined together (e.g., where the video coder determines that one of per-pixel BDOF is performed for a sub-block or BDOF is bypassed for the sub-block).

Moreover, in some examples, determining whether to perform per-pixel BDOF or to bypass BDOF for a sub-block may be based on determining a distortion value and comparing the distortion value to a threshold value. In some examples, the video coder may be configured to determine the distortion value in such a way that the calculations used to the determine the distortion value can be reused by the video coder when performing per-pixel BDOF. For example, if the video coder is to perform per-pixel BDOF, then the video coder may reuse the results from the calculation performed to determine the distortion value to perform per-pixel BDOF.

In one example, the disclosure describes a method of decoding video data, the method comprising: determining that bi-directional optical flow (BDOF) is enabled for a block of the video data; dividing the block into a plurality of sub-blocks based on the determination that BDOF is enabled for the block; determining, for each sub-block of one or more sub-blocks of the plurality of sub-blocks, respective distortion values; determining that one of per-pixel BDOF is performed or BDOF is bypassed for each sub-block of the one or more sub-blocks of the plurality of sub-blocks based on the respective distortion values; determining prediction samples for each sub-block of the one or more sub-blocks based on the determination of per-pixel BDOF being performed or BDOF being bypassed; and reconstructing the block based on the prediction samples.

In one example, the disclosure describes a device for decoding video data, the device comprising: memory configured to store the video data; and processing circuitry coupled to the memory and configured to: determine that bi-directional optical flow (BDOF) is enabled for a block of the video data; divide the block into a plurality of sub-blocks based on the determination that BDOF is enabled for the block; determine, for each sub-block of one or more sub-blocks of the plurality of sub-blocks, respective distortion values; determine that one of per-pixel BDOF is performed or BDOF is bypassed for each sub-block of the one or more sub-blocks of the plurality of sub-blocks based on the respective distortion values; determine prediction samples for each sub-block of the one or more sub-blocks based on the determination of per-pixel BDOF being performed or BDOF being bypassed; and reconstruct the block based on the prediction samples.

In one example, the disclosure describes a computer-readable storage medium storing instructions thereon that when executed cause one or more processors to: determine that bi-directional optical flow (BDOF) is enabled for a block of video data; divide the block into a plurality of sub-blocks based on the determination that BDOF is enabled for the block; determine, for each sub-block of one or more sub-blocks of the plurality of sub-blocks, respective distortion values; determine that one of per-pixel BDOF is performed or BDOF is bypassed for each sub-block of the one or more sub-blocks of the plurality of sub-blocks based on the respective distortion values; determine prediction samples for each sub-block of the one or more sub-blocks based on the determination of per-pixel BDOF being performed or BDOF being bypassed; and reconstruct the block based on the prediction samples.

In one example, the disclosure describes a device for decoding video data, the device comprising: means for determining that bi-directional optical flow (BDOF) is enabled for a block of the video data; means for dividing the block into a plurality of sub-blocks based on the determination that BDOF is enabled for the block; means for determining, for each sub-block of one or more sub-blocks of the plurality of sub-blocks, respective distortion values; means for determining that one of per-pixel BDOF is performed or BDOF is bypassed for each sub-block of the one or more sub-blocks of the plurality of sub-blocks based on the respective distortion values; means for determining prediction samples for each sub-block of the one or more sub-blocks based on the determination of per-pixel BDOF being performed or BDOF being bypassed; and means for reconstructing the block based on the prediction samples.

The details of one or more examples are set forth in the accompanying drawings and the description below. Other features, objects, and advantages will be apparent from the description, drawings, and claims.

DETAILED DESCRIPTION

Figure 1:
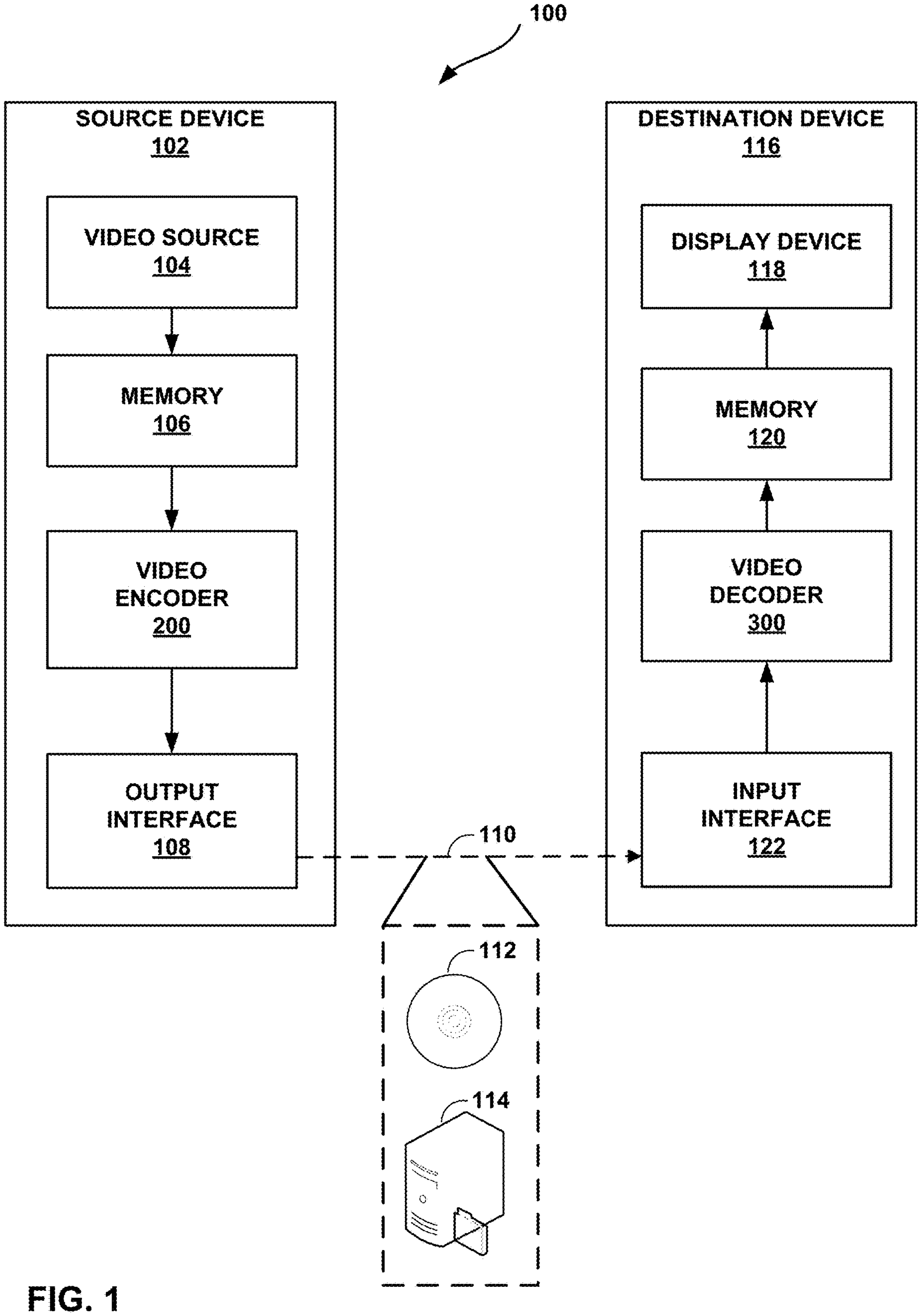
FIG. 1 is a block diagram illustrating an example video encoding and decoding system that may perform the techniques of this disclosure.

A video encoder may be configured to generate a prediction block from one or more reference blocks in one or more reference pictures with one or more motion vectors for the block. The video encoder determines a residual between the prediction block and the block, and signal information indicative of the residual and information used to determine the motion vector. A video decoder receives the information indicative of the residual and the information used to determine the motion vector. The video decoder determines the motion vector(s), determines the reference block(s) from the motion vector(s), and generates the prediction block. The video decoder adds the prediction block to the residual to reconstruct the block.

In some cases, the reference block and the prediction block are the same block. However, the reference block and the prediction block being the same is not required in all examples. In some examples, such as in bi-prediction, the video encoder and video decoder may determine a first reference block based on a first motion vector, and a second reference block based on a second motion vector. The video encoder and video decoder may blend the first and second reference blocks to generate a prediction block.

Moreover, in some examples, the video encoder and the video decoder may generate the prediction block based on adjustments to the sample values of the first and second reference blocks. One example way to adjust sample values to generate samples of a prediction block is referred to as bi-directional optical flow (BDOF). For example, assume that) $I^{(0)}(x,y)$ refers to the first reference block, and $I^{(1)}(x,y)$ refers to the second reference block. In BDOF, a prediction block may be considered as) $I^{(0)}(x,y)$ plus $I^{(1)}(x,y)$. As described below, the video encoder and the video decoder may determine adjustment factors (i.e., b(x,y)) and add the adjustment factors to the prediction block (i.e., $I^{(0)}(x,y)+I^{(1)}(x,y)+b(x,y)$) as part of the process of determining the prediction samples. There may be additional scaling and offsetting of the result of $I^{(0)})(x,y)+I^{(1)}(x,y)+b(x,y)$ to determine the prediction samples.

In BDOF, the video encoder and the video decoder utilize the motion vector to determine adjustment factors (e.g., factors that multiplied or added) to adjust the sample values of the prediction block to generate the prediction samples. As one example, the video encoder and the video decoder may generate the prediction samples by adding corresponding samples of the first reference block, the second reference block, and corresponding values generated from motion refinement.

There may be various types of BDOF techniques. One example of BDOF is sub-block BDOF, and another example of BDOF techniques is per-pixel BDOF. In sub-block BDOF, the video encoder and the video decoder determine a motion refinement (also called refined motion) for the sub-block. For sub-block BDOF, the video encoder and the video decoder use the same motion refinement to adjust samples from a prediction block, where the prediction block may be generated with a first reference block and a second reference block (e.g., a sum of the first reference block and the second reference block, or a weighted average of the first reference block and the second reference block). In per-pixel BDOF, the video encoder and the video decoder may determine motion refinement factors that may be different for two or more samples in the current block. For per-pixel BDOF, the video encoder and the video decoder may use the motion refinements (also called refined motions) determined on a per-pixel sample to adjust samples from a prediction block, which may be generated with the first reference block and the second reference block.

BDOF or other refinement techniques may be selectively enabled at a block level, but whether BDOF is applied or not at a sub-block level may be inferred based on distortion values. For example, the video encoder may enable BDOF for a block, and signal information indicating that BDOF is enabled for the block.

In response, the video decoder may divide the block into a plurality of sub-blocks based on the determination that BDOF is enabled for the block. Although BDOF is enabled for the block, the video decoder may determine whether BDOF is actually to be performed or bypassed on a sub-block-by-sub-block basis. For example, the video decoder determine, for each sub-block of one or more sub-blocks of the plurality of sub-blocks, respective distortion values.

In accordance with one or more examples described in this disclosure, the video decoder may determine that one of per-pixel BDOF is performed or BDOF is bypassed for each sub-block of the one or more sub-blocks of the plurality of sub-blocks based on the respective distortion values. For example, the video decoder may determine a first distortion value for a first sub-block, and determine that per-pixel BDOF is performed for the first sub-block based on the first distortion value. The video decoder may determine a second distortion value for a second sub-block, and determine that BDOF is bypassed for the second sub-block based on the second distortion value, and so forth.

In one or more examples, if the video decoder determines that BDOF is performed, the video decoder may perform per-pixel BDOF, and other BDOF techniques may not be available to the video decoder. That is, the video decoder may determine that one of per-pixel BDOF is performed or BDOF is bypassed for each sub-block, in a sub-block-by-sub-block basis. When BDOF is performed, the BDOF technique available to the video decoder may be per-pixel BDOF, and other BDOF techniques may not be available.

In one or more examples, as described above, the video decoder may determine distortion values for determining whether per-pixel BDOF is performed or whether BDOF is bypassed on a sub-block-by-sub-block basis. In some examples, as will be described in more detail below, the video decoder may reuse calculations used to determine the distortion values for determining per-pixel motion refinement for per-pixel BDOF. For instance, for a first sub-block, a video decoder may determine a first distortion value. Assume that for the first sub-block, the video decoder determined that per-pixel BDOF is enabled. In some examples, rather than recalculating all values needed to determine the per-pixel motion refinement, the video decoder may be configured to reuse the results from the calculation that the video decoder performed for determining that per-pixel BDOF is performed for determining the per-pixel motion refinement.

The video decoder may be configured to determine prediction samples for each sub-block of the one or more sub-blocks based on the determination of per-pixel BDOF being performed or BDOF being bypassed. For example, assume that, for a sub-block, per-pixel BDOF is performed. In this example, the video decoder may generate prediction samples for the sub-block by refining samples of a prediction block (e.g., a block generated from combining two reference blocks) based on the per-pixel motion refinement. As another example, assume that, for a sub-block, BDOF is bypassed. In this example, the video decoder may not perform refinement of samples of a prediction block to generate the prediction samples. Rather, the samples of the prediction block may the same as the prediction samples (or possibly with some adjustment that is not based on BDOF). For example, when BDOF is bypassed, the video encoder and the video decoder may generate the prediction samples by determining a weighted average of corresponding samples in the first reference block and the second reference block.

The video decoder may reconstruct the block based on the prediction samples. For example, the video decoder may receive residual values indicative of a difference between the prediction samples and samples of the block, and add the residual values to the prediction samples to reconstruct the block. The above examples are described from the perspective of the video decoder. The video encoder may be configured to perform similar techniques. For instance, the prediction samples generated by the video decoder should be the same as the prediction samples generated by the video encoder. Therefore, the video encoder may perform similar techniques as those described above to determine the prediction samples in the same way as the video decoder.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, a including desktop computer, a notebook (i.e., laptop) computer, a mobile device, a tablet computer, a set-top box, a telephone handsets such as smartphones, a television, a camera, a display device, a digital media player, a video gaming console, a video streaming device, a broadcast receiver device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion vector derivation techniques, such as template matching, bilateral matching, decoder-side motion vector (MV) refinement, and bi-directional optical flow. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for decoder-side motion vector derivation techniques, such as template matching, bilateral matching, decoder-side motion vector (MV) refinement, and bi-directional optical flow (BDOF). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. That is, there may be a computer-readable storage medium storing instructions thereon that when executed cause one or more processors to perform the example techniques described in this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

The following describes video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification is available from ITU-T H.265, "Series H: Audiovisual and Multimedia Systems, Infrastructure of Audiovisual Services-Coding of Moving Video, High efficiency Video Coding," The International Telecommunication Union. December 2016, 664 Pages.

ITU-T VCEG (Q6/16) and ISO/IEC MPEG (JTC 1/SC 29/WG 11) are studying standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The latest version of reference software, i.e., VVC Test Model 10 (VTM 10.0) could be downloaded from vcgit.hhi.fraunhofer.de/jvet/VVCSoftware_VTM.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-52001-vA (hereinafter "VVC Draft 10"). Editorial refinement of VVC Draft 10 is described in Bross, et al. "Versatile Video Coding Editorial Refinements on Draft 10," Joint Video Experts Team (WET) of ITU-T SG 16 WP 3 and ISO/IEC JTC 1/SC 29/WG 11, 20$^{th}$ Meeting: by teleconference, 7-16 Oct. 2020, JVET-T2001-v2. Algorithm description of Versatile Video Coding and Test Model 10 (VTM 10.0) could be referred to as: J. Chen, Y. Ye and S. Kim, "Algorithm description for Versatile Video Coding and Test Model 11 (VTM 11)," JVET-T2002, December 2020 (hereinafter JVET-T2002). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to perform bi-directional optical flow (BDOF). For example, video encoder 200 may be configured to perform BDOF as part of encoding the current block, and video decoder 300 may be configured to perform BDOF as part of decoding the current block.

As described in more detail, in some examples, a video coder (e.g., video encoder 200 and/or video decoder 300) may be configured to divide an input block into a plurality of sub-blocks, wherein a size of the input block is less than or equal to a size of a coding unit, determine that bi-directional optical flow (BDOF) is to be applied to a sub-block of the plurality of sub-blocks based on a condition being satisfied, divide the sub-block into a plurality of sub-sub-blocks, determine a refined motion vector for one or more of the sub-sub-blocks, wherein the refine motion vector for a sub-sub-block of the one or more sub-sub-blocks is the same for a plurality of samples in the sub-sub-block, and perform BDOF for the sub-block based on the refined motion vector for the one or more sub-sub-blocks.

As another example, the video coder may be configured to divide an input block into a plurality of sub-blocks, wherein a size of the input block is less than or equal to a size of a coding unit, determine that bi-directional optical flow (BDOF) is to be applied to a sub-block of the plurality of sub-blocks based on a condition being satisfied, divide the sub-block into a plurality of sub-sub-blocks, determine a refined motion vector for each of one or more samples in the sub-block, and perform BDOF for the sub-block based on the refined motion vector for each of the one or more samples in the sub-block.

For example, as described above, video encoder 200 or video decoder 300 may determine a refined motion vector for each of the one or more samples in the sub-block, and perform BDOF based on the refined motion vector for each of the one or more samples in the sub-block. In this disclosure, performing BDOF based on the refined motion vector for each of the one or more samples in the sub-block is referred to as "per-pixel BDOF." For instance, in per-pixel BDOF, a refined motion vector for each sample in the sub-block is separately determined, rather than having one refined motion vector that is the same for all samples in the sub-block.

A refined motion vector may not necessarily mean that the motion vector for the sub-block is changed. Rather, the refined motion vector for a sample may be used to determine an amount by which a sample in a prediction block is adjusted to generate a prediction sample. For instance, for a first sample of a first sub-block, a first refined motion vector may indicate how much to adjust a first sample in the prediction block to generate a first prediction sample, for a second sample of the first sub-block, a second refined motion vector may indicate how much to adjust a second sample in the prediction to generate a second prediction sample, and so forth.

In accordance with one or more examples described in this disclosure, video encoder 200 and video decoder 300 may determine that one of per-pixel BDOF is performed or BDOF is bypassed for each sub-block of one or more sub-blocks of the block (e.g., input block) based on respective distortion values. For example, as described above, video encoder 200 and video decoder 300 may perform per-pixel BDOF based on a condition being satisfied. The condition being satisfied may be if a distortion value for a sub-block is greater than a threshold.

Accordingly, in some examples, the options for video encoder 200 and video decoder 300 may be set to either performing per-pixel BDOF or bypassing BDOF for a sub-block based on whether a distortion value for the sub-block is greater than a threshold or less than or equal to the threshold. For instance, in some techniques, it may be possible for video encoder 200 and video decoder 300 to perform per-pixel BDOF, but not determine whether BDOF is bypassed on sub-block-by-sub-block basis. In some techniques where BDOF could be bypassed on a sub-block-by-sub-block basis, per-pixel BDOF may not have been available. With the example techniques described in this disclosure, video encoder 200 and video decoder 300 may be configured to selectively perform per-pixel BDOF or bypass BDOF, which may result in better video compression that properly balances decoding overhead.

In one or more examples, for encoding or decoding video data, respectively, video encoder 200 and video decoder 300 may be configured to determine that BDOF is enabled for a block of the video data, and divide the block into a plurality of sub-blocks based on the determination that BDOF is enabled for the block, or more generally, when BDOF is enabled for the block. Video encoder 200 and video decoder 300 may determine, for each sub-block of one or more sub-blocks of the plurality of sub-blocks, respective distortion values. Example ways in which to determine the respective distortion values is described in more detail below. Video encoder 200 and video decoder 300 may determine that one of per-pixel BDOF is performed or BDOF is bypassed for each sub-block of the one or more sub-blocks of the plurality of sub-blocks based on the respective distortion values, and determine prediction samples for each sub-block of the one or more sub-blocks based on the determination of per-pixel BDOF being performed or BDOF being bypassed.

Video encoder 200 may determine residual values indicative of a difference between the prediction samples and samples of the block, and may signal residual values. Video decoder 300 may receive the residual values that are indicative of the difference between the prediction samples and the samples of the block, and may add the residual values to the prediction samples to reconstruct the block. In some examples, to receive the residual values, video decoder 300 may be configured to receive information indicative of the residual values, from which video decoder 300 determines the residual values.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
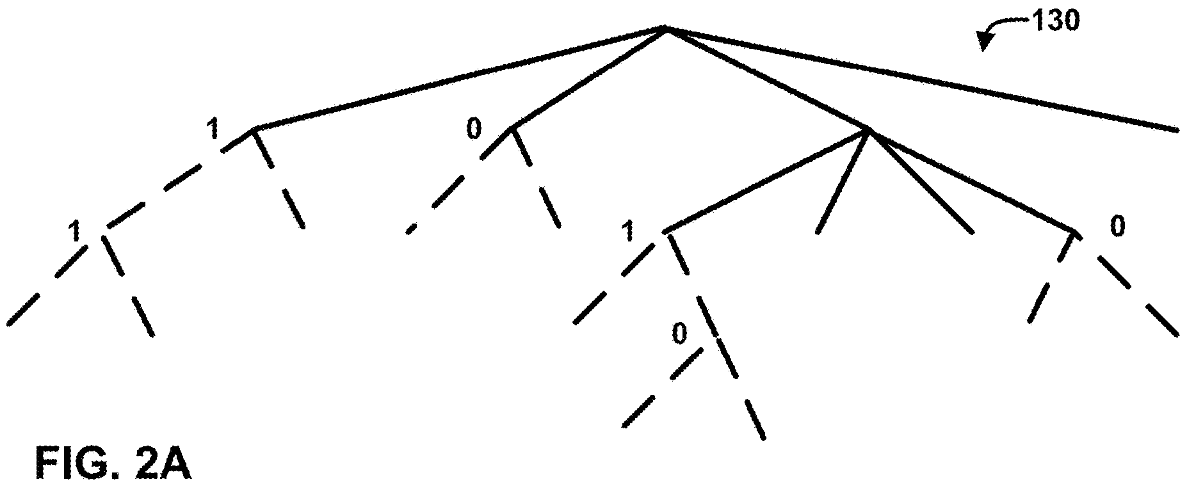
FIGS. 2A and 2B are conceptual diagrams illustrating an example quadtree binary tree (QTBT) structure, and a corresponding coding tree unit (CTU).
Figure 2B:
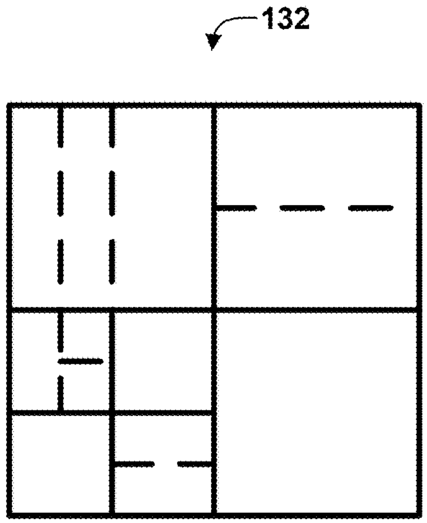

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBT Size, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
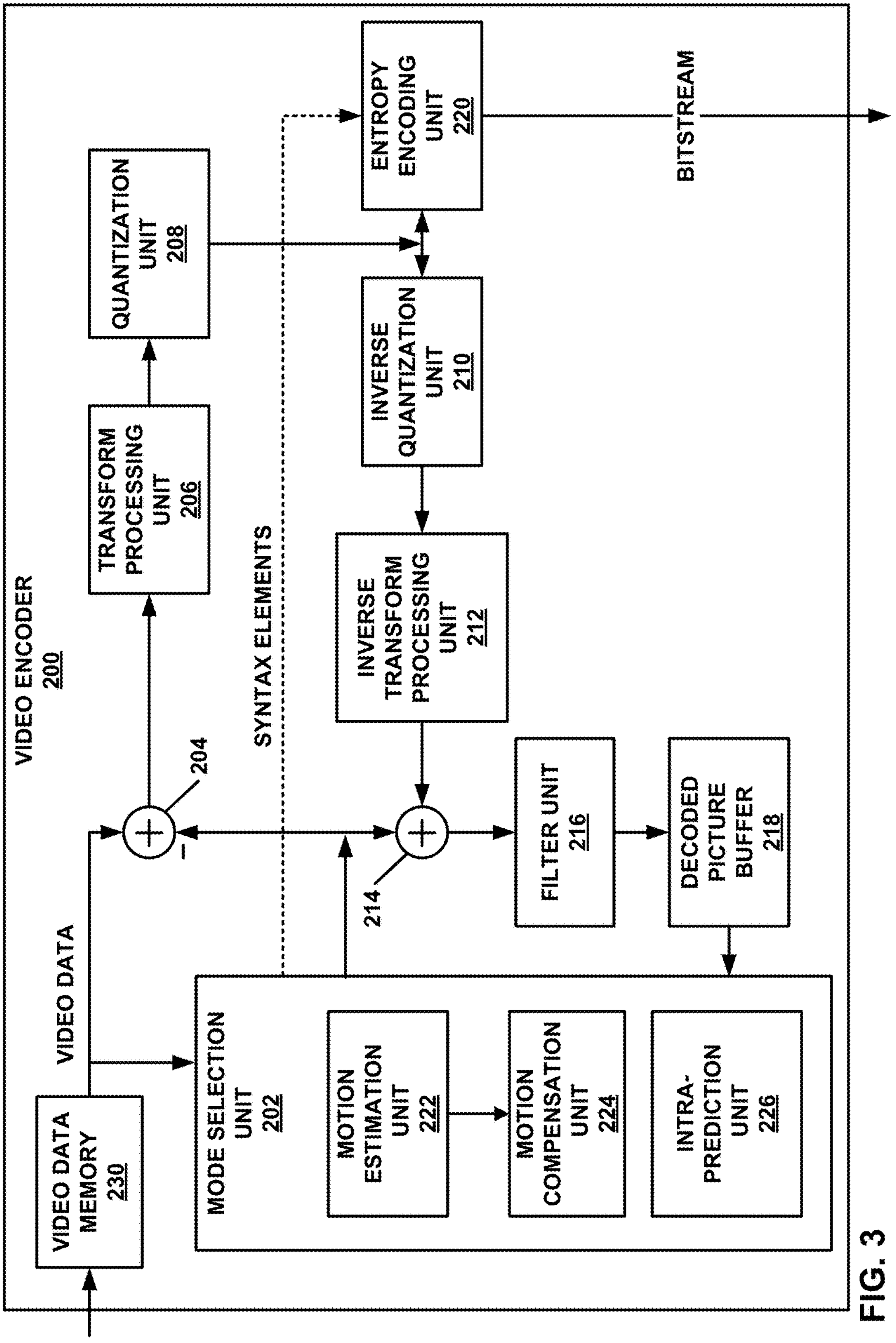
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof.

Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to divide an input block into a plurality of sub-blocks, wherein a size of the input block is less than or equal to a size of a coding unit, determine that bi-directional optical flow (BDOF) is to be applied to a sub-block of the plurality of sub-blocks based on a condition being satisfied, divide the sub-block into a plurality of sub-sub-blocks, determine a refined motion vector for one or more of the sub-sub-blocks, wherein the refine motion vector for a sub-sub-block of the one or more sub-sub-blocks is the same for a plurality of samples in the sub-sub-block, and perform BDOF for the sub-block based on the refined motion vector for the one or more sub-sub-blocks.

As another example, the one or more processing units implemented in circuitry may be configured to divide an input block into a plurality of sub-blocks, wherein a size of the input block is less than or equal to a size of a coding unit, determine that bi-directional optical flow (BDOF) is to be applied to a sub-block of the plurality of sub-blocks based on a condition being satisfied, divide the sub-block into a plurality of sub-sub-blocks, determine a refined motion vector for each of one or more samples in the sub-block, and perform BDOF for the sub-block based on the refined motion vector for each of the one or more samples in the sub-block.

As yet another example, the processing circuitry of video encoder 200 may be configured to determine that bi-directional optical flow (BDOF) is enabled for a block of the video data, divide the block into a plurality of sub-blocks based on the determination that BDOF is enabled for the block, determine, for each sub-block of one or more sub-blocks of the plurality of sub-blocks, respective distortion values, determine that one of per-pixel BDOF is performed or BDOF is bypassed for each sub-block of the one or more sub-blocks of the plurality of sub-blocks based on the respective distortion values, determine prediction samples for each sub-block of the one or more sub-blocks based on the determination of per-pixel BDOF being performed or BDOF being bypassed, determine residual values indicative of a difference between the prediction samples and the block, and signal information indicative of the residual values.

Figure 4:
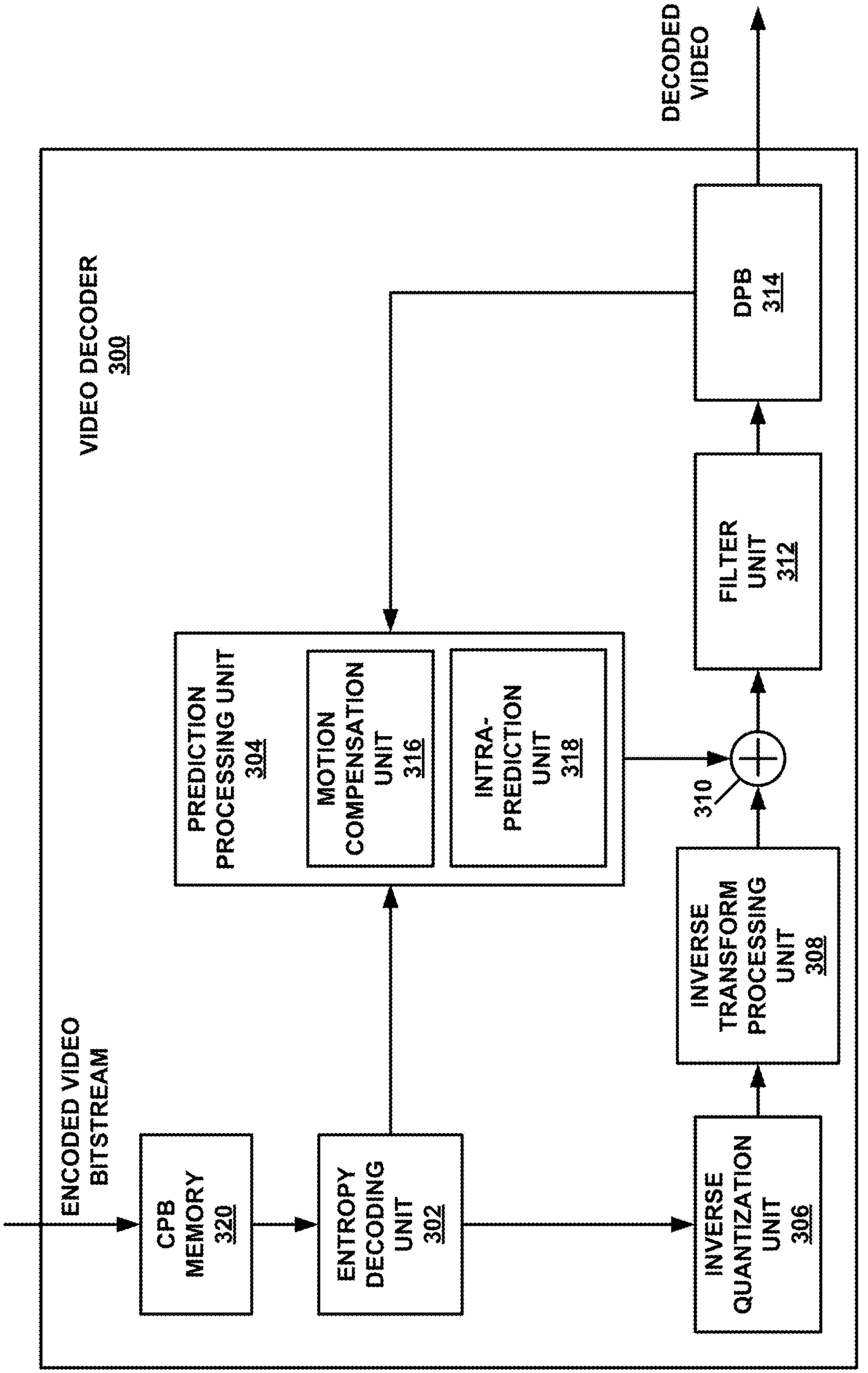
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to divide an input block into a plurality of sub-blocks, wherein a size of the input block is less than or equal to a size of a coding unit, determine that bi-directional optical flow (BDOF) is to be applied to a sub-block of the plurality of sub-blocks based on a condition being satisfied, divide the sub-block into a plurality of sub-sub-blocks, determine a refined motion vector for one or more of the sub-sub-blocks, wherein the refine motion vector for a sub-sub-block of the one or more sub-sub-blocks is the same for a plurality of samples in the sub-sub-block, and perform BDOF for the sub-block based on the refined motion vector for the one or more sub-sub-blocks.

As another example, the one or more processing units implemented in circuitry may be configured to divide an input block into a plurality of sub-blocks, wherein a size of the input block is less than or equal to a size of a coding unit, determine that bi-directional optical flow (BDOF) is to be applied to a sub-block of the plurality of sub-blocks based on a condition being satisfied, divide the sub-block into a plurality of sub-sub-blocks, determine a refined motion vector for each of one or more samples in the sub-block, and perform BDOF for the sub-block based on the refined motion vector for each of the one or more samples in the sub-block.

As another example, the processing circuitry (e.g., motion compensation unit 316) of video decoder 300 may be configured to determine that bi-directional optical flow (BDOF) is enabled for a block of the video data, divide the block into a plurality of sub-blocks based on the determination that BDOF is enabled for the block, determine, for each sub-block of one or more sub-blocks of the plurality of sub-blocks, respective distortion values, determine that one of per-pixel BDOF is performed or BDOF is bypassed for each sub-block of the one or more sub-blocks of the plurality of sub-blocks based on the respective distortion values, determine prediction samples for each sub-block of the one or more sub-blocks based on the determination of per-pixel BDOF being performed or BDOF being bypassed, and reconstruct the block based on the prediction samples. For example, the processing circuitry may receive residual values indicative of a difference between the prediction samples and samples of the block, and add the residual values to the prediction samples to reconstruct the block.

The following describes CU structure and motion vector prediction in HEVC. The following may provide additional context to the above description of CU and motion vector prediction, and may include some repetition of the above description to assist with understanding.

In HEVC, the largest coding unit in a slice is called a coding tree block (CTB) or coding tree unit (CTU). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, i.e. inter or intra. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU. When the CU is inter coded, each PU has one set of motion information, which is derived with a unique inter prediction mode.

The following describes motion vector prediction. In HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index is to be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

The following describes spatial neighboring candidates. For example, FIGS. 5A and 5B are conceptual diagrams illustrating examples of spatial neighboring motion vector candidates for merge mode and advanced motion vector predictor (AMVP) mode, respectively.

Figure 5A:
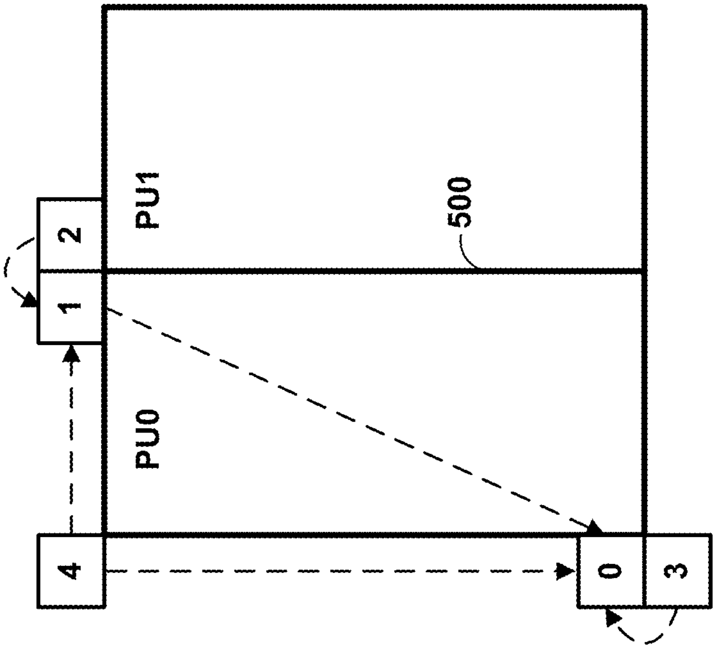
FIGS. 5A and 5B are conceptual diagrams illustrating examples of spatial neighboring motion vector candidates for merge mode and advanced motion vector predictor (AMVP) mode, respectively.
Figure 5B:
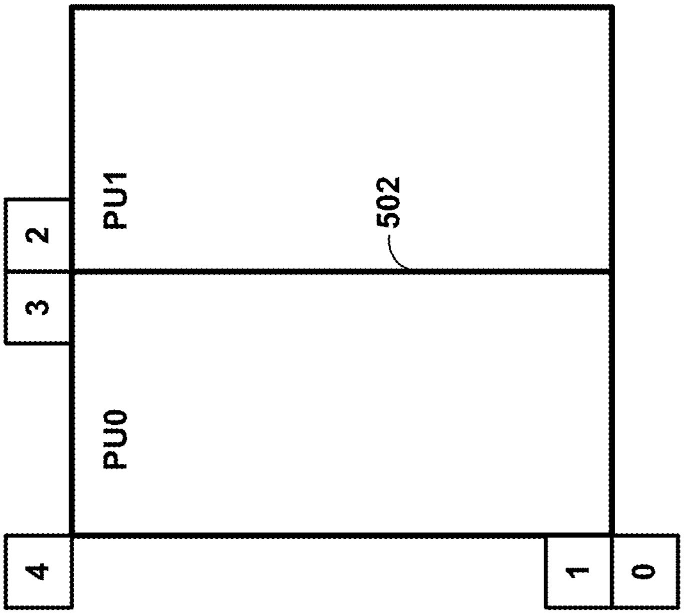

Spatial MV candidates are derived from the neighboring blocks shown in FIGS. 5A and 5B, for a specific PU ($PU_0$) 500, although the methods generating the candidates from the blocks differ for merge and AMVP modes. In merge mode, up to four spatial MV candidates can be derived with the orders showed in FIG. 5A with numbers, and the order is the following: left (0, A1), above (1, B1), above right (2, B0), below left (3, A0), and above left (4, B2), as shown in FIG. 5A In AVMP mode, the neighboring blocks are divided into two groups: left group consisting of the block 0 and 1, and above group consisting of the blocks 2, 3, and 4 as shown in PU0 502 in FIG. 5B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate, thus the temporal distance differences can be compensated.

The following describes temporal Motion Vector Prediction in HEVC. Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

Figure 6B:
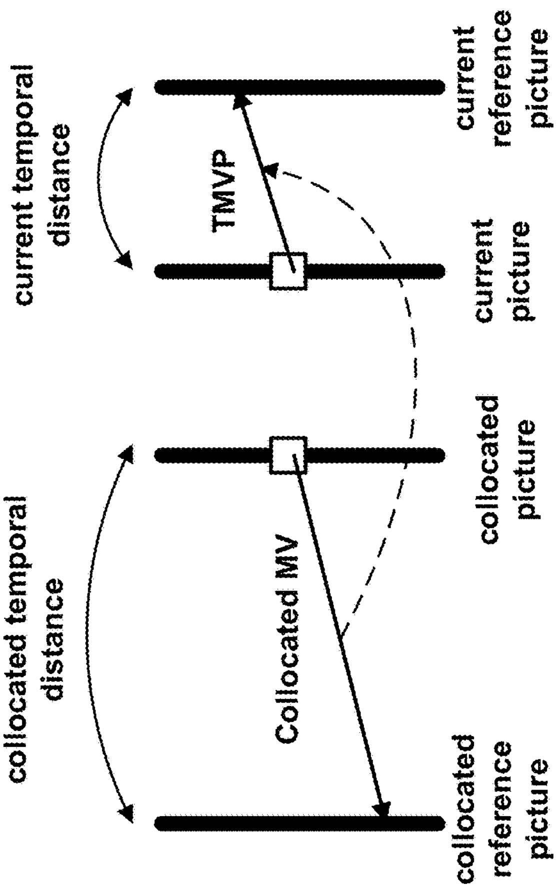
FIGS. 6A and 6B are conceptual diagrams illustrating examples of a temporal motion vector predictor (TMVP) candidate and motion vector scaling, respectively.
Figure 6A:
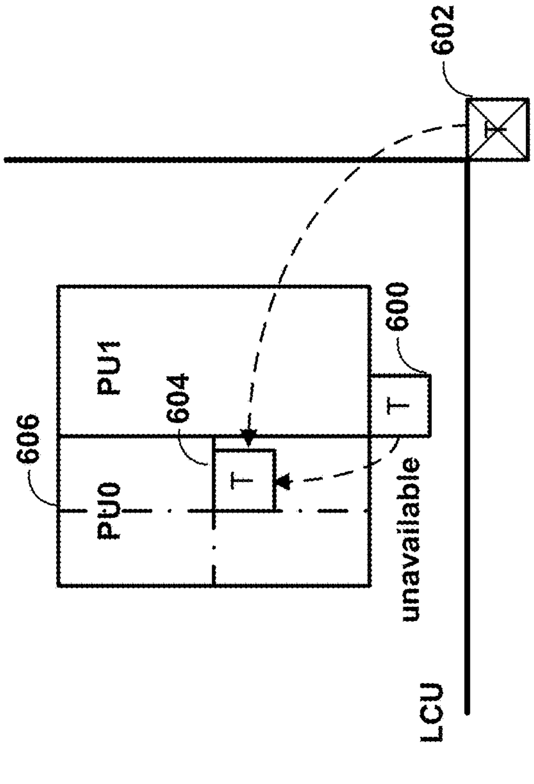

The primary block location for TMVP candidate derivation is the bottom right block outside of the collocated PU as shown in FIG. 6A as a block "T," illustrated as block 602, to compensate the bias to the above and left blocks used to generate spatial neighboring candidates. However, if that block is located outside of the current CTB row or motion information is not available, the block is substituted with a center block of the PU, illustrated as block 604.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV is to be scaled to compensate the temporal distance differences, as shown in FIG. 6B.

The following describes addition aspects of motion prediction in HEVC.

Several aspects of merge and AMVP modes are worth mentioning as follows. Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates are generated and inserted at the end of the list until it will have all candidates.

In merge mode, there are two types of artificial MV candidates: combined candidate derived only for B-slices and zero candidates used only for AMVP if the first type do not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

The following describes template matching prediction. Template matching (TM) prediction is a special merge mode based on Frame-Rate Up Conversion (FRUC) techniques. With this mode, motion information of a block is not signalled but derived at the decoder side (e.g., by video decoder 300). TM prediction is applied to both AMVP mode and regular merge mode. In AMVP mode, MVP candidate selection is determined based on template matching to pick up the one which reaches the minimal difference between current block template and reference block template. In regular merge mode, a TM mode flag is signalled to indicate the use of TM and then TM is applied to the merge candidate indicated by merge index for MV refinement.

Figure 7:
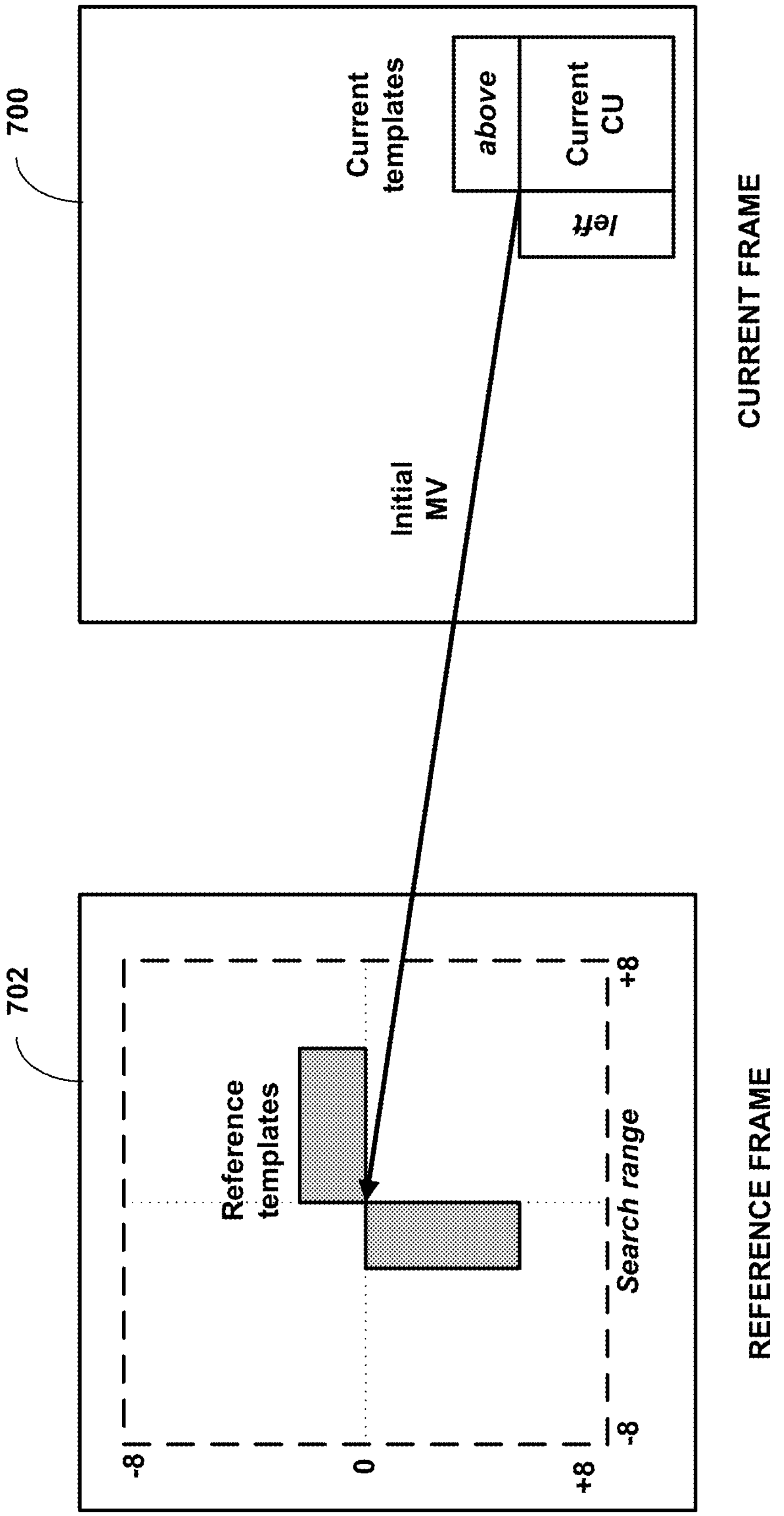
FIG. 7 is a conceptual diagram illustrating template matching performed on a search area around initial motion vector (MV).

As shown in FIG. 7, template matching is used to derive motion information of the current CU by finding the closest match between a template (top and/or left neighboring blocks of the current CU) in the current frame 700 and a block (same size to the template) in a reference frame 702. With an AMVP candidate selected based on initial matching error, the MVP of the AMVP candidate is refined by template matching. With a merge candidate indicated by signaled merge index, the merged MVs of the merge candidate corresponding to L0 and L1 are refined independently by template matching and then the less accurate one is further refined again with the better one as a prior.

For the cost function, when a motion vector points to a fractional sample position, motion compensated interpolation may be utilized. To reduce complexity, bi-linear interpolation instead of regular 8-tap DCT-IF interpolation is used for both template matching to generate templates on reference pictures. The matching cost C of template matching is calculated as follows:

$$C = SAD + w\cdot\left(|MV_x - MV_x^s| + |MV_y - MV_y^s|\right)$$

In the above equation, w is a weighting factor which is empirically set to 4, MV and $MV^s$ indicate the currently testing MV and the initial MV (i.e., an MVP candidate in AMVP mode or merged motion in merge mode), respectively. SAD (sum of absolute difference) is used as the matching cost of template matching.

When TM is used, motion is refined by using luma samples only. The derived motion may be used for both luma and chroma for MC (motion compensation) inter prediction. After MV is decided, final MC is performed using 8-taps interpolation filter for luma and 4-taps interpolation filter for chroma.

For the search method, MV refinement is a pattern based MV search with the criterion of template matching cost. Two search patterns are supported: a diamond search and a cross search for MV refinement. The MV is directly searched at quarter luma sample MVD accuracy with diamond pattern, followed by quarter luma sample MVD accuracy with cross pattern, and then this is followed by one-eighth luma sample MVD refinement with cross pattern. The search range of MV refinement is set equal to (−8, +8) luma samples around the initial MV.

The following describes bilateral matching prediction. Bilateral Matching (also called Bilateral Merge) (BM) prediction is another merge mode base on Frame-Rate Up Conversion (FRUC) techniques. When a block is determined to apply the BM mode, two initiate motion vectors MV0 and MV1 are derived by using a signaled merge candidate index to select the merge candidate in a constructed merge list. The bilateral matching search may be around the MV0 and MV1. The final MV0' and MV1' are derived base on the minimum Bilateral Matching cost.

Figure 8:
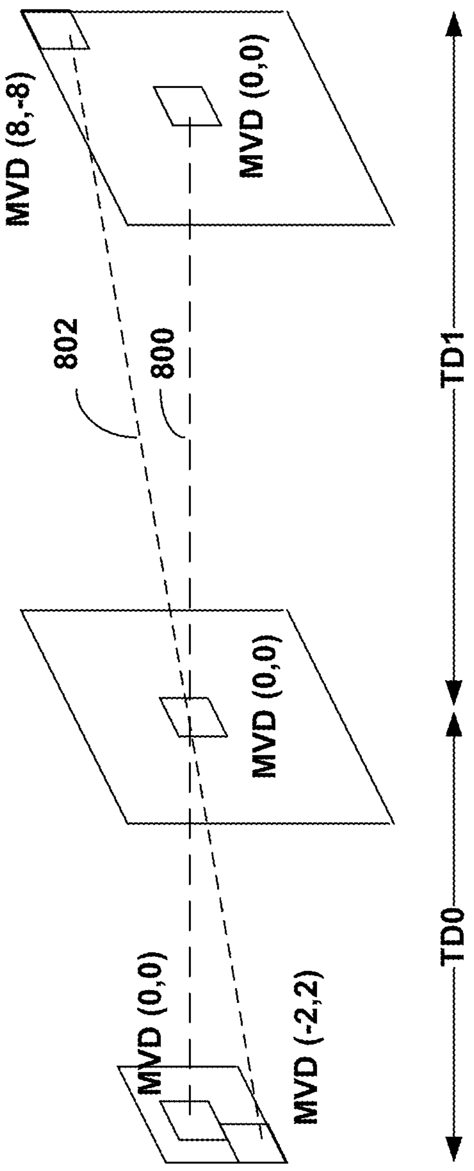
FIG. 8 is a conceptual diagram illustrating examples of motion vector differences that are proportional based on temporal distances.

The motion vector difference MVD0 800 (denoted by MV0'-MV0) and MVD1 802 (denoted by MV1'-MV1) pointing to the two reference blocks may be proportional to the temporal distances (TD), e.g. TD0 and TD1, between the current picture and the two reference pictures. FIG. 8 illustrates an example of MVD0 and MVD1 wherein, the TD1 is 4 times of TD0.

Figure 9:
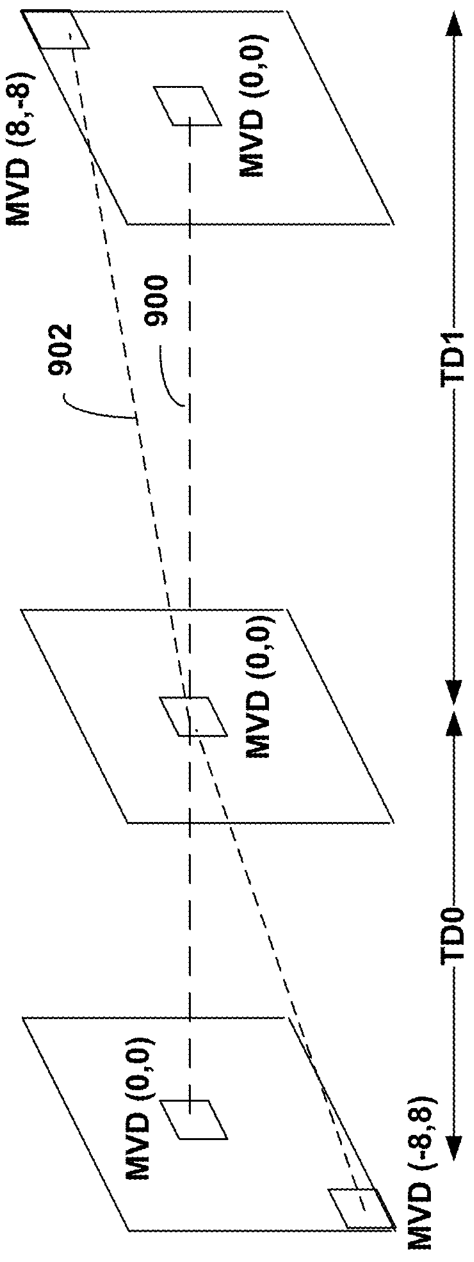
FIG. 9 is a conceptual diagram illustrating examples of motion vector differences that are mirrored regardless of temporal distances.

However, there is an optional design that MVD0 and MVD1 are mirrored regardless of the temporal distances TD0 and TD1. FIG. 9 illustrates an example of mirrored MVD0 900 and MVD1 902 wherein, the TD1 is 4 times of TD0.

Figure 10:
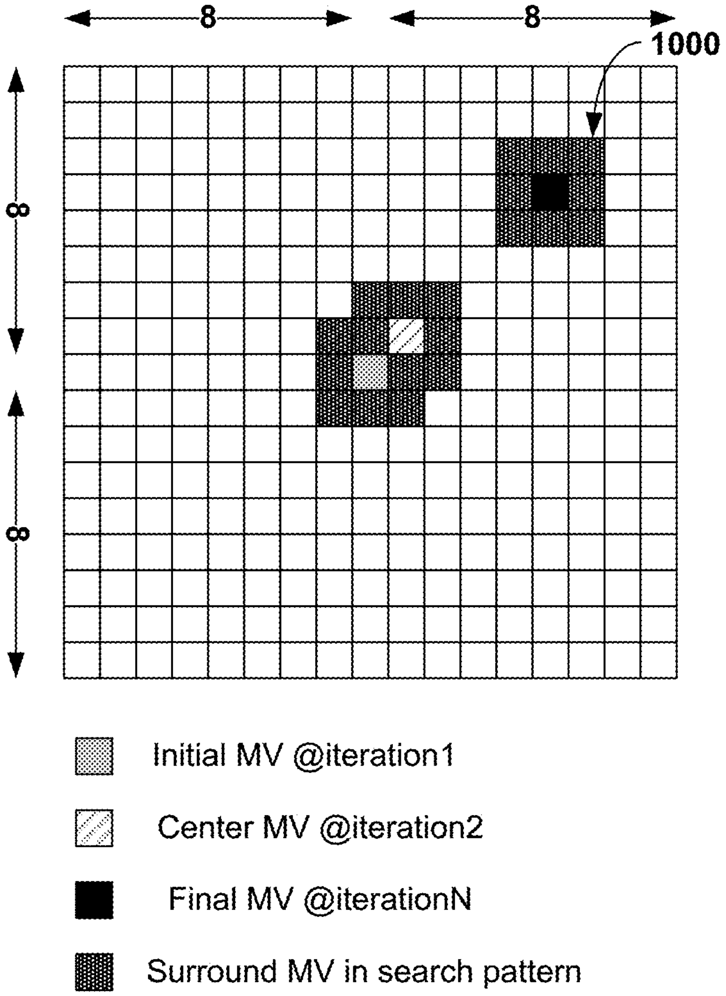
FIG. 10 is a conceptual diagram illustrating an example of 3×3 square search pattern in the search range of [−8,8].

Bilateral Matching performs a local search around the initial MV0 and MV1 to derive the final MV0' and MV1'. The local search applies a 3×3 square search pattern to loop through the search range [−8, 8]. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or the local search reaches the predefined maximum search iteration. FIG. 10 illustrates an example of the 3×3 square search pattern 1000 in the search range [−8, 8].

Figure 11:
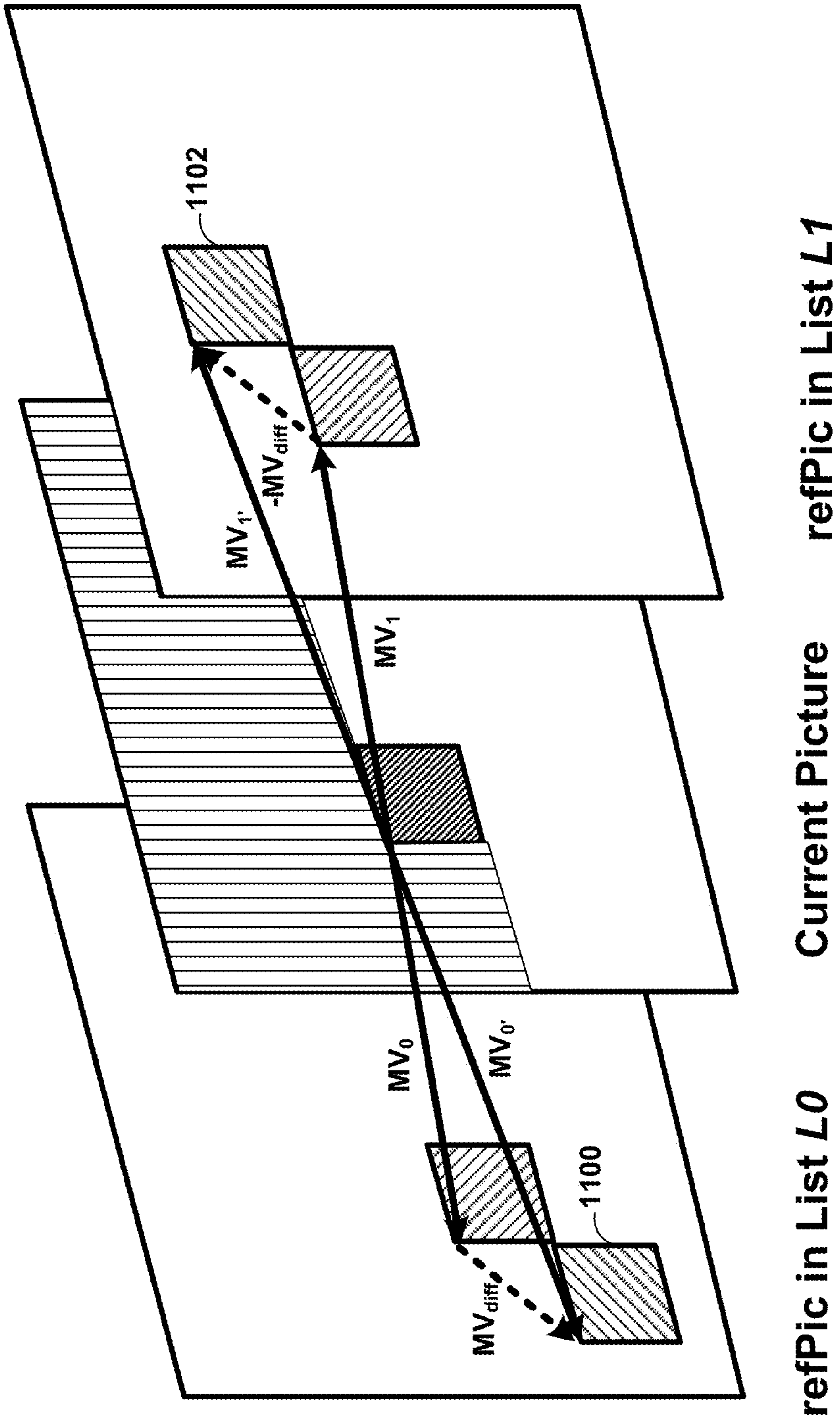
FIG. 11 is a conceptual diagram illustrating an example of decoding side motion vector refinement.

The following describes decoder-side motion vector refinement. To increase the accuracy of the MVs of the merge mode, a decoder side motion vector refinement (DMVR) is applied in VVC. In bi-prediction operation, a refined MV is searched around the initial MVs in the reference picture list L0 and reference picture list L1. The DMVR method calculates the distortion between the two candidate blocks in the reference picture list L0 and list L1. As illustrated in FIG. 11, the SAD between the blocks 1102 and 1100 based on each MV candidate around the initial MV is calculated. The MV candidate with the lowest SAD becomes the refined MV and used to generate the bi-predicted signal.

The refined MV derived by DMVR process is used to generate the inter prediction samples and also used in temporal motion vector prediction for future pictures coding. While the original MV is used in deblocking process and also used in spatial motion vector prediction for future CU coding.

DMVR is a sub-block based merge mode with a predefined maximum processing unit of 16×16 luma samples. When the width and/or height of a CU is larger than 16 luma samples, the CU may be further split into subblocks with width and/or height equal to 16 luma samples.

The following describes a searching scheme. In DVMR, the search points that are surrounding the initial MV and the MV offset may conform to a MV difference mirroring rule. For example, any points that are checked by DMVR, denoted by candidate MV pair (MV0, MV1) may conform to the following two equations:

$$MV0' = MV0 + \text{MW\_offset}$$

$$MV1' = MV1 - \text{MV\_offset}$$

In the above equation, MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, the original MV during the DMVR process may be favored. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C$$

In the above equation, $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0)))$$

$$y_{min} = (E(0, -1) - E(0, 1))/(2((E(0, -1) + E(0, 1) - 2E(0, 0)))$$

The value of $x_{min}$ and $y_{min}$ are automatically constrained to be between −8 and 8 since all cost values are positive and the smallest value is E(0,0). This corresponds to half pel offset with 1/16th-pel MV accuracy in VVC. The computed fractional $(x_{min}, y_{min})$ are added to the integer distance refinement MV to get the sub-pixel accurate refinement delta MV.

The following describes bilinear-interpolation and sample padding. In VVC, the resolution of the MVs is 1/16 luma samples. The samples at the fractional position are interpolated using an 8-tap interpolation filter. In DMVR, the search points are surrounding the initial fractional-pel MV with integer sample offset, therefore the samples of those fractional position may be interpolated for DMVR search process. To reduce the calculation complexity, the bi-linear interpolation filter is used to generate the fractional samples for the searching process in DMVR. In some examples, by using bi-linear filter with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

The following describes example enabling conditions for DMVR. DMVR is enabled if the following conditions are all satisfied.

a. CU level merge mode with bi-prediction MV
b. One reference picture is in the past and another reference picture is in the future with respect to the current picture
c. The distances (i.e. POC difference) from both reference pictures to the current picture are same
d. CU has more than 64 luma samples
e. Both CU height and CU width are larger than or equal to 8 luma samples
f. BCW (bi-prediction with CU-level Weights) weight index indicates equal weight
g. WP (weighted prediction) is not enabled for the current block
h. CIIP (combined inter and intra prediction) mode is not used for the current block The following describes bi-directional optical flow. Bi-directional optical flow (BDOF) is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block.

For example, for BDOF, video encoder 200 and video decoder determine that BDOF is enabled for a block, and may divide the block into a plurality of sub-blocks when BDOF is enabled for the block. In some examples, video encoder 200 and video decoder 300 may determine a first reference block from a first motion vector for the block, and a second reference block from a second motion vector for the block. Video encoder 200 and video decoder 300 may blend (e.g., weighted average) the samples in the first reference block and the samples in the second reference block to generate a prediction block. Video encoder 200 and video decoder 300 may determine the motion refinement, and adjust the samples in the prediction block to generate prediction samples used for encoding or decoding the samples of the sub-block. In some examples, video encoder 200 and video decoder 300 may determine a motion refinement that is the same for each sample in the sub-block (i.e., a sub-block level motion refinement, referred to as sub-block BDOF). In some examples, video encoder 200 and video decoder 300 may determine a motion refinement or each samples in the sub-block (i.e., a sample level motion refinement, referred to as per-pixel BDOF).

The following steps are applied in the BDOF process, which may be applicable to sub-block BDOF. The steps for per-pixel BDOF are described in more detail further below.

First, the horizontal and vertical gradients, $$\frac{\partial J^{(k)}}{\partial x}(i, j) \text{ and } \frac{\partial I^{(k)}}{\partial y}(i, j),\ k = 0, 1,$$

of the two prediction signals are computed by directly calculating the difference between two neighboring samples, i.e., $$\frac{\partial I^{(k)}}{\partial x}(i, j) = \left(I^{(k)}(i+1, j) \gg \text{shift1}\right) - \left(I^{(k)}(i-1, j) \gg \text{shift1}\right)$$

$$\frac{\partial I^{(k)}}{\partial y}(i, j) = \left(I^{(k)}(i, j+1) \gg \text{shift1}\right) - \left(I^{(k)}(i-1, j) \gg \text{shift1}\right)$$

In the above example, $I^{(k)}(i, j)$ are the sample value at coordinate (i,j) of the prediction signal in list k, k=0,1, and shift1 is calculated based on the luma bit depth, bitDepth, as shift1 is set to be equal to 6. That is $I^{(0)}$ refers to samples of a first reference block, and $I^{(1)}$ refers to samples of a second reference block, where the first reference block and the second reference block were used to generate a prediction block whose samples are being adjusted in accordance with the BDOF techniques.

Then, the auto- and cross-correlation of the gradients, $S_1$, $S_2$, $S_3$, $S_5$ and $S_6$, are calculated as:

$$S_1 = \Sigma_{(i,j)\in\Omega}|\psi_x(i, j)|,\ S_3 = \Sigma_{(i,j)\in\Omega}\theta(i, j)\cdot(-\text{sign}(\psi_x(i, j))) \quad (1\text{-}6\text{-}2)$$

$$S_2 = \Sigma_{(i,j)\in\Omega}\psi_x(i, j)\cdot\text{sign}(\psi_y(i, j))$$

$$S_5 = \Sigma_{(i,j)\in\Omega}|\psi_y(i, j)|\quad S_6 = \Sigma_{(i,j)\in\Omega}\theta(i, j)\cdot(-\text{sign}(\psi_y(i_2 j))),$$

where $$\psi_x(i, j) = \left(\frac{\partial I^{(1)}}{\partial x}(i, j) + \frac{\partial I^{(0)}}{\partial x}(i, j)\right) \gg \text{shift3} \quad (1\text{-}6\text{-}3)$$

$$\psi_y(i, j) = \left(\frac{\partial I^{(1)}}{\partial y}(i, j) + \frac{\partial I^{(0)}}{\partial y}(i, j)\right) \gg \text{shift3}$$

$$\theta(i, j) = (I^{(0)}(i, j) \gg \text{shift2}) - (I^{(1)}(i, j) \gg \text{shift2}),$$

where Ω is a 6×6 window around the 4×4 sub-block, the value of shift2 is set to be equal to 4, and the value of shift3 is set to be equal to 1.

The motion refinement $(v_x, v_y)$ is then derived using the cross- and auto-correlation terms using the following. In this example, the motion refinement is for the sub-block. The per-pixel motion refinement calculation is described in more detail below.

$$v_x = S_1 > 0\,?\,\text{clip3}(-th'_{BIO}, th'_{BIO}, -((S_3 \ll 2) \gg \lfloor \log_2 S_1 \rfloor)):0 \quad (1-6-4)$$

$$v_y = S_5 > 0\,?\,\text{clip3}\left(-th'_{BIO}, th'_{BIO}, -((S_6 \ll 2) \gg ((v_x \cdot S_2) \gg \lfloor \log_2 S_1 \rfloor)):0\right.$$

Where, $$th'_{BIO} = 1 \ll 4 \cdot \lfloor \cdot \rfloor$$

is the floor function.

Based on the motion refinement and the gradients, the following adjustment is calculated for each sample in the 4×4 sub-block:

$$b(x, y) = v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right) \quad (1\text{-}6\text{-}5)$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) \gg \text{shift5} \quad (1-6-6)$$

Wherein, shift5 is set equal to Max(3, 15−BitDepth) and the variable $o_{offset}$ is set equal to (1<<(shift5−1)).

In the above examples, $I^{(0)}$ refers to a first reference block, $I^{(1)}$ refers to a second reference block, and b(x,y) is the adjustment value that is determined based on the motion refinement $(v_x, v_y)$ for the sub-block. In some examples, $I^{(0)}(x,y)+I^{(1)}(x,y)$ may be considered as a prediction block, and therefore, b(x,y) may be considered as adjusting the prediction block. As shown in the equation (1-6-6), there may be an addition of $o_{offset}$ and right shift operation by shift5 to generate the prediction samples ($pred_{BDOF}(x,y)$).

The above describes an example for sub-block BDOF, in which video encoder 200 and video decoder 300 determine a motion refinement $(v_x, v_y)$ that is the same for all samples in the sub-block is the same. The adjustment value b(x,y) may be different for each sample in the sub-block because of the gradient, but the motion refinement may be the same.

As described in more detail further below, in per-pixel BDOF, video encoder 200 and video decoder 300 may determine a per-pixel motion refinement $(v_x', v_y')$. That is, rather than there being one motion refinement for the sub-block, as in sub-block BDOF, in per-pixel BDOF, there may be a different motion refinement for each sample (e.g., pixel). Video encoder 200 and video decoder 300 may determine an adjustment value b'(x,y) for each sample based on the corresponding per-pixel motion refinement for that sample, rather than using the motion refinement that is the same for the sub-block.

In some examples, the values from equation 1-6-6 are selected such that the multipliers in the BDOF process do not exceed 15-bit, and the maximum bit-width of the intermediate parameters in the BDOF process is kept within 32-bit.

Figure 12:
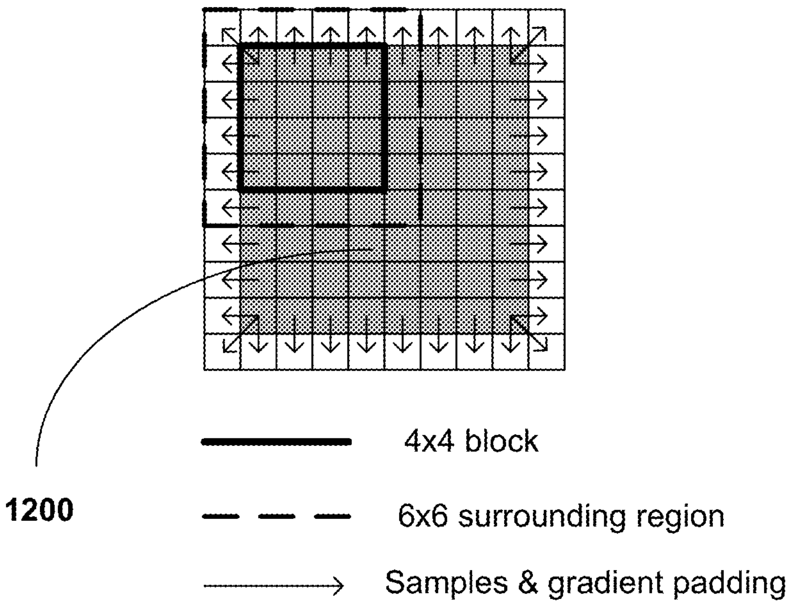
FIG. 12 is a conceptual diagram illustrating an extended coding unit (CU) used in bi-directional optical flow (BDOF).

In order to derive the gradient values, some prediction samples $I^{(k)}(i,j)$ in list k (k=0,1) outside of the current CU boundaries are generated by video encoder 200 and video decoder 300. As depicted in FIG. 12, the BDOF uses one extended row/column around the boundaries of CU 1200. In order to control the computational complexity of generating the out-of-boundary prediction samples, video encoder 200 and video decoder 300 may generate prediction samples in the extended area (white positions) by taking the reference samples at the nearby integer positions (using floor( ) operation on the coordinates) directly without interpolation, and the normal 8-tap motion compensation interpolation filter is used to generate prediction samples within the CU (gray positions). These extended sample values may be used in gradient calculation only. For the remaining steps in the BDOF process, if any sample and gradient values outside of the CU boundaries are needed, the sample and gradient values are padded (i.e., repeated) from their nearest neighbors.

BDOF is used to refine the bi-prediction signal (e.g., sum of first reference block and second reference block) of a CU at the 4×4 subblock level. BDOF is applied to a CU if all of the following conditions are satisfied:

a. The CU is coded using "true" bi-prediction mode, i.e., one of the two reference pictures is prior to the current picture in display order and the other is after the current picture in display order
b. The CU is not coded using affine mode or the ATMVP merge mode
c. CU has more than 64 luma samples
d. Both CU height and CU width are larger than or equal to 8 luma samples
e. BCW weight index indicates equal weight
f. WP is not enabled for the current CU
g. CIIP mode is not used for the current CU There may be some problems with BDOF. As described above, in the current version of VVC, the BDOF method is used to refine the bi-prediction signal of luma samples in a coding block at the 4×4 sub-block level. The motion refinement ($v_x$, $v_y$) is derived by minimizing the difference between the L0 and L1 prediction samples in 6×6 luma samples regions. The L0 prediction samples refers to samples of a first reference block, and the L1 prediction samples refers to the sample of a second reference block. The motion refinement ($v_x$, $v_y$) is then used to adjust each prediction sample of the 4×4 sub-block.

However, a luma sample in the 4×4 sub-block may have a different motion refinement characteristic compared to other luma samples in the 4×4 sub-block. Calculating the motion refinement ($v'_x$, $v'_y$) at the pixel level can improve the accuracy of the motion refinement for each pixel, therefore it can improve the sub-block or block prediction quality.

However, BDOF is a decoder side process, and the complexity of BDOF is also an important aspect to be considered when design a video coding method. When the motion refinement ($v'_x$, $v'_y$) is calculated in pixel-level, the complexity of BDOF can be 16 times compared to the current BDOF at the 4×4 sub-block level. In other words, the current 4×4 sub-block BDOF does not achieve the best prediction quality. The per-pixel BDOF has better prediction quality, but the complexity is a problem for the video coding.

In VVC Draft 10, when Decoder-side motion vector refinement (DMVR) is preceded by BDOF, the BDOF process can be bypassed based on the minimum SAD at the DMVR search process. The DMVR process is at 16×16 sub-block level. This BDOF bypass scheme can reduce the complexity.

However, the prediction signal of a sub-area within the 16×16 sub-block may need to be refined by BDOF. The BDOF bypass of VVC Draft 10 scheme can not apply BDOF at a sub-area within the 16×16 sub-block and in the meanwhile, bypass BDOF at other sub-areas. In VVC Draft 10, there is no bypass BDOF scheme when BDOF is applied to a bi-predicted (which is not DMVR predicted) coding block.

The following describes example techniques that may address the above problems. However, the techniques should not be considered limited to or required to addressing the above problems. The following techniques may be used separately or in any combination, as practical. For ease, the following techniques are described as various aspects, but such aspects should not be considered as required to be separate, and the various aspects can be combined, as practical. The example aspects may be performed by video encoder 200 and/or video decoder 300, unless specified otherwise.

A first aspect relates to bypassing sub-block BDOF. In this first aspect, when a W×H coding block is decided to apply bi-directional optical flow (BDOF), video encoder 200 and/or video decoder 300 may bypass BDOF process for a sub area of the coding block. The BDOF process for the first aspect may be as follows.

a. The BDOF process starts with an input block (name as S1), wherein, S1 has a dimension W_1×H_1, wherein, the dimension of S1 is equal or less than the dimension of the coding block. When the preceded process is block based, the dimension of S1 is equal as the coding block. When the preceded process is sub-block bases (subblock partition due to hardware constrain or from previous processing stage), the dimension of S1 is less than the coding block).
b. The input block S1 is divided to N sub-blocks (name as S2), wherein, S2 has a dimension W_2×H_2, wherein, the dimension of S2 is equal or less than the dimension of S1. For each S2, determined by a condition T, S2 is decided to whether apply BDOF or not. In some examples, the condition T is to check whether the SAD between two prediction signals in reference picture 0 and reference picture 1 are less than a threshold or not. The subblock in this step defines a basic unit for decision of whether to apply BDOF to all the samples within the unit.
c. When decided to apply BDOF to a S2, S2 is divided to M sub-blocks (name as S3), wherein, S3 has a dimension W_3×H_3, wherein, the dimension of S3 is equal or less than the dimension of S2. For each S3, the BDOF process is applied to derive a refined motion vector ($v'_x$, $v'_y$), and use the derived motion vector to derive the prediction signal of S3 (either through motion compensation or adding offset to the initial predicted signal). The subblock in this step defines the unit for the granularity of the refined motion vector, all the samples within the unit share the same refined motion.

In the BDOF process of aspect one, blocks S1, S2 and S3 are defined. The dimension of S3 may be equal or less than S2, and the dimension of S2 may be equal or less than S1. In other words, W_3 is equal or less than W_2 and H_3 is equal or less than H_2, and W_2 is equal or less than W_1 and H_2 is equal or less than Hi. The sizes may be fixed, adapted to the picture resolution, or signalled in the bitstream.

One case is that W_3 is equal to 1 and H_3 is equal to 1, where S3 is pixel based. This case may be a per-pixel BDOF process.

In some examples, S1 is the coding block, regardless a preceded sub-block based process is applied to the coding block or not.

A second aspect relates to per-pixel BDOF with sub-block BDOF bypass scheme. As in the first aspect, when a W×H coding block (S1) is decided to apply bi-directional optical flow (BDOF), the coding block is divided to N sub-blocks (S2). For each sub-block, whether to apply BDOF to the sub-block or not is further determined by checking whether the SAD between two prediction signals in reference picture 0 and reference picture 1 is less than a threshold or not. If decided to apply BDOF to the sub-block, a refined motion vector ($v'_x$, $v'_y$) is calculated for each pixel (S3) within the sub-block (S2). The refined motion vector ($v'_x$, $v'_y$) is used to adjust the predicted signal for that pixel (S3) within the sub-block (S2). One example of per-pixel BDOF with sub-block bypass process is shown in FIG. 13.

Figure 13:
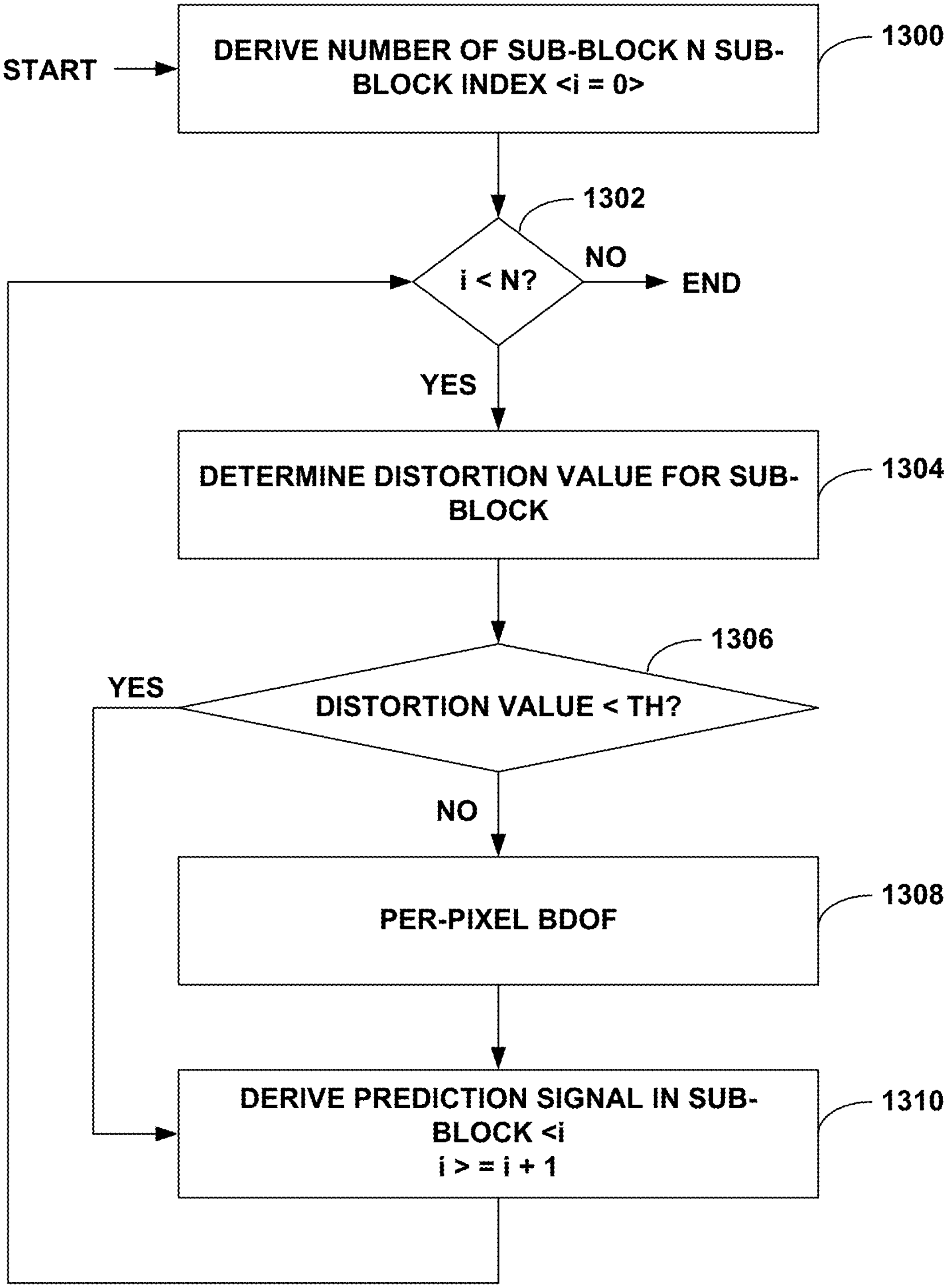
FIG. 13 is a flowchart illustrating an example process of per-pixel BDOF with sub-block bypass.

For example, in FIG. 13, video encoder 200 and video decoder 300 may determine that BDOF is enabled for a block of video data, and video encoder 200 and video decoder 300 may divide the block into a plurality of sub-blocks based on the determination that BDOF is enabled for the block. As illustrated in FIG. 13, derive number of sub-block N sub-block index <i=0> (1300) refers to video encoder 200 and video decoder 300 dividing a block into N sub-blocks, where each sub-block is identified by a respective index, and the first index is 0. Hence, the indices range from 0 to N−1.

Video encoder 200 and video decoder 300 may determine whether prediction samples for all sub-blocks in the blocks have been determined, as represented by i<N (1302). If prediction samples for all sub-blocks have been determined (NO of 1302), video encoder 200 and video decoder 300 may end the process of determining prediction samples for the sub-blocks. However, if prediction samples for all sub-blocks have not been determined (YES of 1302), then video encoder 200 and video decoder 300 may continue the process of determining prediction samples of a current sub-block of the plurality of sub-blocks that the block was divided into.

For a current sub-block, video encoder 200 and video decoder 300 may determine a distortion value (1304). As determination for the distortion value may be done on a sub-block-by-sub-block basis, video encoder 200 and video decoder 300 may be considered as determining, for each sub-block of one or more sub-blocks of the plurality of sub-blocks, respective distortion values (e.g., first distortion value for first sub-block, second distortion value for second sub-block, and so forth).

One example way to determine the distortion value for the current sub-block is by determining a sum of absolute difference (SAD) between a first reference block (ref0) and a second reference block (ref1). However, there may be other ways in which to determine the distortion value. For instance, as described in more detail further below, in some examples, video encoder 200 and video decoder 300 may determine the distortion value in such a way that the resulting values can be reused later, such as when video encoder 200 and video decoder 300 are to perform BDOF.

As illustrated in FIG. 13, video encoder 200 and video decoder 300 may compare the distortion value to a threshold value (1306). Based on the comparison, video encoder 200 and video decoder 300 may have two options. The first option may be to perform per-pixel BDOF, and the second option may be to bypass BDOF. There may not be other options to video encoder 200 and video decoder 300, such as sub-block BDOF. Accordingly, video encoder 200 and video decoder 300 may be considered as determining that one of per-pixel BDOF is performed or BDOF is bypassed for each sub-block of the one or more sub-blocks of the plurality of sub-blocks based on the respective distortion values (e.g., based on a comparison of respective distortion values to a fixed threshold value or respective threshold values).

For example, if the distortion value for the current sub-block is greater than the threshold value (NO of 1306), video encoder 200 and video decoder 300 may perform per-pixel BDOF (1308). If the distortion value for the current sub-block is less than the threshold value (YES of 1306), video encoder 200 and video decoder 300 may derive prediction signal in sub-block (e.g., by bypassing BDOF for the sub-block) (1310).

In one or more examples, video encoder 200 and video decoder 300 may determine prediction samples for each sub-block of the one or more sub-blocks based on the determination of per-pixel BDOF being performed or BDOF being bypassed. For example, if video encoder 200 and video decoder 300 are to perform BDOF on a current sub-block, video encoder 200 and video decoder 300 may determine the prediction samples using per-pixel BDOF techniques, but if video encoder 200 and video decoder 300 are to bypass BDOF on the current sub-block, video encoder 200 and video decoder 300 may determine the prediction samples not using BDOF techniques.

The above example of FIG. 13 described how a determination of whether per-pixel BDOF is performed for a current sub-block or BDOF is bypassed. Video encoder 200 and video decoder 300 may perform the above example techniques on a sub-block-by-sub-block basis.

For instance, to determine, for each sub-block of one or more sub-blocks of the plurality of sub-blocks, respective distortion values, for a first sub-block of the one or more sub-blocks, video encoder 200 and video decoder 300 may determine a first distortion value of the respective distortion values, and, for a second sub-block of the one or more sub-blocks, video encoder 200 and video decoder 300 may determine a second distortion value of the respective distortion values.

To determine that one of per-pixel BDOF is performed or BDOF is bypassed for each sub-block of the one or more sub-blocks of the plurality of sub-blocks based on the respective distortion values, for the first sub-block of the plurality of sub-blocks, video encoder 200 and video decoder 300 may determine that BDOF is enabled for the first sub-block based on the first distortion value (e.g., based on the first distortion value being greater than a threshold value). In this example, based on the determination that BDOF is enabled for the first sub-block, video encoder 200 and video decoder 300 may determine per-pixel motion refinement for refining a first set of prediction samples for the first sub-block (e.g., perform per-pixel BDOF). For example, video encoder 200 and video decoder 300 may, for a first sample of the first sub-block, derive a first motion refinement for refining a first prediction sample, for a second sample of the first sub-block, derive a second motion refinement for refining a second prediction sample, and so forth.

However, for the second sub-block of the plurality of sub-blocks, video encoder 200 and video decoder 300 may determine that BDOF is bypassed based on the second distortion value (e.g., based on the second distortion value being less than the threshold value). In this example, based on the determination that BDOF is bypassed for the second block, video encoder 200 and video decoder 300 may bypass determining per-pixel motion refinement for refining a second set of prediction samples for the second sub-block (e.g., bypass BDOF). For example, video encoder 200 and video decoder 300 may, for a first sample of the first sub-block, bypass derivation a first motion refinement for refining a first prediction sample, for a second sample of the first sub-block, bypass derivation a second motion refinement for refining a second prediction sample, and so forth.

To determine the prediction samples for each sub-block of the one or more sub-blocks based on the determination of per-pixel BDOF being performed or BDOF being bypassed, video encoder 200 and video decoder 300 may, for the first sub-block, determine the refined first set of prediction samples of the first sub-block based on the per-pixel motion refinement for the first sub-block. For the second sub-block, video encoder 200 and video decoder 300 may determine the second set of prediction samples without refining the second set of prediction samples based on the per-pixel motion refinement for refining the second set of prediction samples.

Within the second aspect, the following describes bypass sub-block BDOF. Given a W×H coding block that is decided to apply bi-directional optical flow (BDOF), the number of sub-blocks N is determined as follows:

a. numSbX=(W>thW)?(W/thW):1 b. numSbY=(H>thH)?(H/thH):1 c. N=numSbX*numSbY

In the above, thW represents the maximum sub-block width and thH represents the maximum sub-block height. The values of thW and thH are predetermined integer value (e.g. thW=thH=8).

For each sub-block, video encoder 200 and/or video decoder 300 may derive a prediction signal predSig0 and a prediction signal predSig1 from reference picture 0 and reference picture 1, respectively. The width (sbWidth) and height (sbHeight) of predSig0 and predSig1 are determined as follows:

a. sbWidth=(W>thW)?thW:W b. sbHeight=(H>thH)?thH:H

Whether bypass BDOF at the sub-block or not is determined by checking the SAD between predSig0 and predSig1. The SAD is derived as follows:

$$sbSAD = \sum_{(i,j)\in\Omega''} \left|I^{(1)}(i,j) - I^{(0)}(i,j)\right| \quad (3\text{-}1\text{-}1\text{-}1)$$

In the above equation, Ω" is the sbWidth×sbHeight sub-block, $I^{(k)}(i,j)$ is the sample value at coordinate (i,j) of the prediction signal in reference picture k, k=0, 1.

If sbSAD is less than a threshold sbDistTh, video encoder 200 and/or video decoder 300 may determine to bypass BDOF at the sub-block, otherwise (if sbSAD is equal or greater than sbDistTh), video encoder 200 and/or video decoder 300 may determine to apply BDOF to the sub-block. The threshold sbDistTh is derived as follows:

$$sbDistTH = (sbWidth \cdot sbHeight \cdot s) \ll n \quad (3\text{-}1\text{-}1\text{-}2)$$

In the above equation, n and s are predetermined value. For example, n can be derived as: n=InternalBitDepth−bitDepth+1. In the above equation, s represents a scale factor, e.g. s=1. In the current version of VVC, the InternalBitDepth is equal to 14 at bitDepth 10, therefore, n is equal to 5. The scale s may be 1, 2, 3 other predefined values, or signalled in the bitstream.

It should be understood that the above describes one example way of determining the threshold value and one example way of determining the distortion value. However, the example techniques are not so limited. As described in more detail below, in some examples, video encoder 200 and video decoder 300 may determine the distortion values in such a way that the calculations used to determine the distortion values can be reused for performing per-pixel BDOF, if the determination is made that per-pixel BDOF is to be performed.

Figure 14:
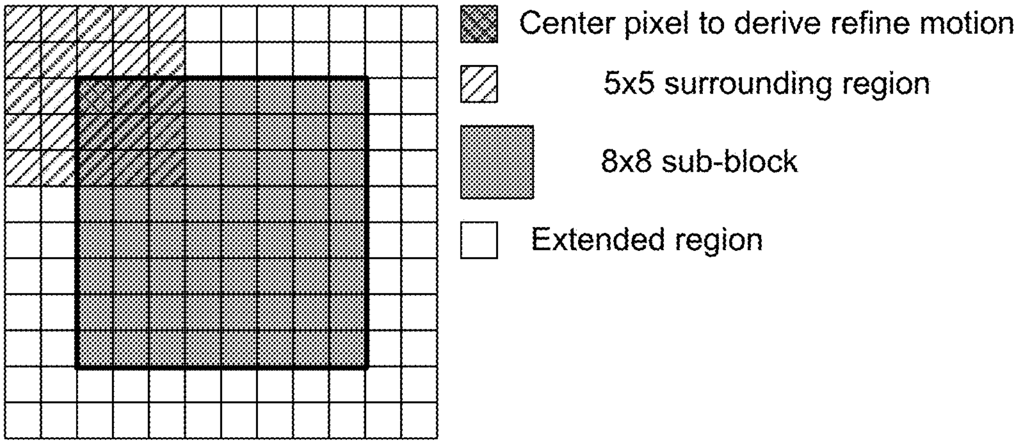
FIG. 14 is a conceptual diagram illustrating an example of per-pixel BDOF of an 8×8 sub-block.

Within the second aspect, the following describes per-pixel BDOF. If video encoder 200 and/or video decoder 300 determined to apply BDOF to a sbWidth×sbHeight sub-block, the sub-block is extended to (sbWidth+4)×(sbHeight+4) region. For each pixel within the sub-block, video encoder 200 and/or video decoder 300 may derive a motion refinement $$(v'_x, v'_y),$$

also called a refined motion vector, based on the gradients of a 5×5 surrounding region. FIG. 14 illustrates an example of per-pixel BDOF of an 8×8 sub-block. Therefore, in per-pixel BDOF, video encoder 200 and video decoder 300 may determine a per-pixel motion refinement. In the sub-block BDOF, the motion refinement is for the sub-block, and not determined on a sample-by-sample (e.g., pixel-by-pixel) basis.

In the above, given a sbWidth×sbHeight sub-block, the following steps are applied in the per-pixel BDOF process.

The horizontal and vertical gradients, $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples as in bi-directional optical flow described above, wherein, (i,j) is the coordinated position in (sbWidth+4)×(sbHeight+4) region of the prediction signal in reference picture 0 and reference picture 1.

For each pixel within the sub-block, the following steps are applied.

The auto- and cross-correlation of the gradients, $S_1$, $S_2$, $S_3$, $S_5$ and $S_6$, are calculated as in bi-directional optical flow described above, wherein 11' is a 5×5 window around the pixel.

The motion refinement $$(v'_x, v'_y)$$

is then derived using the cross- and auto-correlation terms.

Based on the motion refinement and the gradients, the following adjustment is calculated to derive the prediction signal of the pixel:

$$b'(x,y) = v'_x \cdot \left(\frac{\partial I^{(1)}(x,y)}{\partial x} - \frac{\partial I^{(0)}(x,y)}{\partial x}\right) + v'_y \cdot \left(\frac{\partial I^{(1)}(x,y)}{\partial y} - \frac{\partial I^{(0)}(x,y)}{\partial y}\right) \quad (3\text{-}1\text{-}2\text{-}1)$$

$$pred_{BDOF}(x,y) = (I^{(0)}(x,y) + I^{(1)}(x,y) + b'(x,y) + o_{offset}) \gg \text{shift5}$$

In the above examples, $I^{(0)}$ refers to a first reference block, $I^{(1)}$ refers to a second reference block. The adjustment value b'(x,y) is the adjustment value that is determined based on the per-pixel motion refinement ($v'_x$, $v'_y$) for each sample in the sub-block. In some examples, $I^{(0)}(x,y)+I^{(1)}(x,y)$ may be considered as a prediction block, and therefore, b'(x,y) may be considered as adjusting the prediction block. As shown in the equation (3-1-2-1), there may be an addition of $o_{offset}$ and right shift operation by shift5 to generate the prediction samples ($pred_{BDOF}(x,y)$).

A third aspect relates to an alternative sub-block SAD derivation. This example technique for deriving the SAD may be such that values determined for the SAD derivation can be reused for performing per-pixel BDOF. That is, video encoder 200 and video decoder may first determine a distortion value (e.g., SAD value) for a sub-block for determining whether or not to perform per-pixel BDOF. If video encoder 200 and video decoder 300 determine that per-pixel BDOF is to be performed, the calculations that video encoder 200 and video decoder 300 performed for determining whether or not to perform per-pixel BDOF may be reused for performing per-pixel BDOF.

For instance, one way to determine the distortion value for a sub-block is to determine a first reference block (e.g., identified by a first motion vector) and a second reference block (e.g., identified by a second motion vector), and determine a difference value between the samples of the first reference block and samples of the second reference block to determine the distortion value. As an example, as described above, one way to determine the distortion value is to determine $$sbSAD = \sum_{(i,j)\in\Omega''} |I^{(1)}(i,j) - I^{(0)}(i,j)|.$$

In the above equation, $I^{(1)}(i,j)$ refer to samples of a first reference block, and $I^{(0)})(i,j)$ refer to samples of a second reference block. As described further above, to determine motion refinement, including per-pixel motion refinement (e.g., $v'_x$, $v'_y$), video encoder 200 and video decoder 300 may determine $S_1$, $S_2$, $S_3$, $S_5$, and $S_6$, which are auto- and cross-correlation of the gradients. As described in equation 1-6-3, part of determining the auto- and cross-correlation of the gradients is to determine an intermediate value for θ, where $\theta=)(I^{(0)}(i,j)>>shift2)-(1^{(1)}(i,j)>>shift2)$.

Therefore, if per-pixel BDOF is to be performed for a sub-block, video encoder 200 and video decoder 300 may need to determine $(I^{(0)}(i,j)>>shift2)-(I^{(1)}(i, j)>>shift2)$. In one or more examples, as part of determining the distortion value for a sub-block, video encoder 200 and video decoder 300 may determine the distortion value for a sub-block based on $(I^{(0)}(i,j)>>shift2)-(I^{(1)}(i,j)>>shift2)$ instead of (or in addition to) determining the distortion value based on $(I^{(1)}(i,j))-(I^{(0)}(i,j))$. That is, for determining the distortion value for a sub-block, such as for determining whether per-pixel BDOF is to be performed, video encoder 200 and video decoder 300 may determine $(I^{(0)}(i,j)>>shift2)-(I^{(1)}(i, j)>>shift2)$ as the value for sbSAD. This way, if per-pixel BDOF is to be performed, video encoder 200 and video decoder 300 would have already determined the value for $(I^{(0)}(i,j)>>shift2)-(I^{(1)}(i, j)>>shift2)$, which is the value of θ, and is used for determining the motion refinement.

Accordingly, in one or more examples, to determine, for each sub-block of one or more sub-blocks of the plurality of sub-blocks, respective distortion values, video encoder 200 and video decoder 300 may be configured to determine, for each sub-block of the one or more sub-blocks of the plurality of sub-blocks, a first reference block and a second reference block. For instance, $I^{(0)}(i,j)$ may be the first reference block, and $I^{(1)}(i,j)$ may be the second reference block.

Video encoder 200 and video decoder 300 may scale samples of the first reference block and samples of the second reference block. For example, video encoder 200 and video decoder 300 may perform the operation of $I^{(0)}(i,j)>>shift2$. In this example, the value of shift2 may define by how much to scale the value of $I^{(0)}(i,j)$ to generate scaled samples of the first reference block. Similarly, video encoder 200 and video decoder 300 may perform the operation of $I^{(1)}(i,j)>>shift2$. In this example, the value of shift2 may define by how much to scale the value of $I^{(1)}(i,j)$ to generate scaled samples of the second reference block.

Video encoder 200 and video decoder 300 may determine a difference value between the scaled samples of the first reference block and the scaled samples of the second reference block to determine the respective distortion values. For example, video encoder 200 and video decoder 300 may determine $I^{(0)}(i,j)>>shift2)-(I^{(0)}(i,j)>>shift2)$. Video encoder 200 and video decoder 300 may determine the distortion value (e.g., sbSAD) for a sub-block based on the result of $I^{(0)}(i, j)>>shift2)-(I^{(1)}(i,j)>>shift2)$.

As described above, in some examples, there may be computation gains for video encoder 200 and video decoder 300 may be the value of $I^{(0)}(i,j)>>shift2)-(I^{(1)}(i, j)>>shift2)$ can be reused for per-pixel BDOF. For instance, assume that video encoder 200 and video decoder 300 determined that per-pixel BDOF is performed for a first sub-block of one or more sub-blocks of the plurality of sub-blocks that the block being encoded or decoded was divided into.

In this example, video encoder 200 and video decoder 300 may determine, for each sample in the first sub-block, respective motion refinements. That is, video encoder 200 and video decoder 300 may determine motion refinement ($v'_x$, $v'_y$) for each sample of the first sub-block, rather than or in addition to determining one motion refinement ($v_x$, $v_y$) that is the same for all samples in the first sub-block.

Video encoder 200 and video decoder 300 may be configured to determine, for each sample in the first sub-block, respective refined sample values from samples in a prediction block for the first sub-block based on the respective motion refinements. For instance, as described above, the equation to determine the prediction samples for per-pixel BDOF may be $pred_{BDOF}(x, y)=I^{(0)}(x, y)+I^{(1)}(x, y)+b'(x, y)+o_{offset})>>shift5$.

To determine $pred_{BDOF}$, video encoder 200 and video decoder 300 may determine b'(x,y), which is the per-pixel adjustment value determined from respective per-pixel motion refinements (i.e., ($v'_x$, $v'_y$)). In some examples, the prediction block may be considered as the sum of the first reference block and the second reference block (i.e., $I^{(0)}(i, j)+I^{(1)}(i,j)$). As shown in the equation for determining $pred_{BDOF}$, video encoder 200 and video decoder 300 may add $I^{(0)}(i,j)+I^{(0)}(i,j)$ to b'(x,y). Therefore, as part of determining $pred_{BDOF}$, video encoder 200 and video decoder 300 may determine refined samples values (e.g., $pred_{BDOF}$) from samples in a prediction block (e.g., where a prediction block is equal $I^{(0)}(i,j)+I^{(1)}(i,j)$) for the first sub-block based on the respective motion refinements (e.g., ($v'_x$, $v'_y$), which is used to determine b'(x,y)).

Stated another way, video encoder 200 and video decoder 300 may determine a first set of sample values in a first reference block for a first sub-block of the one or more sub-blocks (e.g., determine $I^{(0)}(i,j)$). Video encoder 200 and video decoder 300 may scale the first set of sample values with a scale factor to generate a first set of scaled samples values. That is, to perform $I^{(0)}(i,j)>>shift2$, video encoder 200 and video decoder 300 may be considered as scaling the first set of samples by a scale factor defined by the ">>" and the value of "shift2."

Video encoder 200 and video decoder 300 may determine a second set of sample values in a second reference block for the first sub-block of the one or more sub-blocks (e.g., determine $I^{(1)}(i,j)$). Video encoder 200 and video decoder 300 may scale the second set of sample values with the scale factor to generate a second set of scaled samples values. That is, to perform $I^{(1)}(i,j)$>>shift2, video encoder 200 and video decoder 300 may be considered as scaling the second set of samples by the scale factor defined by the ">>" and the value of "shift2."

Video encoder 200 and video decoder 300 may determine, for the first sub-block, a distortion value based on the first set of scaled sample values and the second set of scaled sample values (e.g., based on $I^{(0)}(i,j)$>>>shift2 and $I^{(1)}(i,j)$>>>shift2). For example, video encoder 200 and video decoder 300 may determine the distortion value for the first sub-block based on $I^{(0)}(i,j)$>>shift2)–($I^{(1)}(i,j)$>>shift2)).

In one or more examples, as described above, assume that per-pixel BDOF is performed for the first sub-block. In this example, video encoder 200 and video decoder 300 may reuse the first set of scaled sample values and the second set of scaled sample values for determining per-pixel motion refinement for per-pixel BDOF. For instance, video encoder 200 and video decoder 300 may reuse the calculation of $I^{(0)}(i,j)$>>shift2)–($I^{(1)}(i,j)$>>>shift2) for determining auto- and cross-correlation of the gradients for determining the per-pixel motion refinement (e.g., ($v'_x$, $v'_y$)). As described above, video encoder 200 and video decoder 300 may use the per-pixel motion refinement to determine the adjustment value of b'(x,y) that is used for determining $pred_{BDOF}$ (i.e., the prediction samples for encoding or decoding the first sub-block of the block).

The above describes an example in which video encoder 200 and video decoder 300 may reuse the first set of scaled sample values and the second set of scaled sample values for determining per-pixel motion refinement for per-pixel BDOF. However, the techniques are not so limited. In some examples, video encoder 200 and video decoder 300 may reuse the first set of scaled sample values and the second set of scaled sample values for determining motion refinement for BDOF. That is, the example techniques may not be limited to reusing first set of scaled sample values and the second set of scaled sample values for per-pixel motion refinement for per-pixel BDOF, but can be used more generally for motion refinement for BDOF (e.g., not limited to per-pixel motion refinement for per-pixel BDOF). There may be reduction in complexity not only for per-pixel BDOF, but also for sub-block based BDOF, as in examples where BDOF includes motion refinement for the whole sub-block, and not pixel-by-pixel.

Accordingly, as in the second aspect, the following describes an alternative method to derive sub-block SAD that is used to determine whether bypass the sub-block or not (i.e., whether BDOF is bypassed or not). As described above, the example method calculates the difference diff (i, j) between two reference signals in the same way of calculating the θ(i,j) as in bi-directional optical flow described above with equations 1-6.

If the sub-block is decided to apply BDOF, the diff (i, j) can be reused in the step to calculate the auto- and cross correlation of the gradients S3 and S6 as in bi-directional optical flow described above.

The equation of (3-1-1-1) in the second aspect is modified as follows:

$$\theta(i,j) = (I^{(0)}(i,j) \gg \text{shift2}) - (I^{(1)}(i,j) \gg \text{shift2}) \qquad (3\text{-}2\text{-}1)$$

$$sbSAD = \sum_{(i,j)\in\Omega''} |\theta(i,j)|$$

In the above equation, $I^{(k)}(i,j)$ is the sample value at coordinate (i,j) in (sbWidth+4)×(sbHeight+4) region of the prediction signal in reference picture k, k=0, 1. Shift2 is a predetermined value, e.g. shift2 is equal to 4. Ω" is the sbWidth×sbHeight sub-block region.

It should be noted that the alternative technique to determine a distortion value for the sub-block (e.g., to determine sbSAD) based on θ(i,j)=($I^{(0)}$)(i, j)>>shift2)–($I^{(1)}$(i, j)>>shift2) should not be considered limited to examples where per-pixel BDOF is performed. The alternative technique to determine a distortion value for the sub-block may be applicable to examples even where sub-block BDOF or some other BDOF technique is applied. For instance, even for sub-block BDOF, video encoder 200 and video decoder 300 may utilize the alternative technique to determine a distortion value for determining whether BDOF is performed or not for a sub-block. If BDOF is to be performed, then video encoder 200 and video decoder 300 may reuse calculation for the alternative technique to determine the distortion value for determining motion refinement as part of sub-block BDOF (e.g., there may be reusing of calculation for the alternative technique to determine the distortion value).

As described above, the threshold value to which the distortion value is compared for determining whether per-pixel BDOF is performed or BDOF is bypassed is sbDistTh, which is calculated as (sbWidth*sbHeight*s)<<n, as shown in equation 3-1-1-2 above. However, in the alternative technique to determine the distortion value, video encoder 200 and video decoder 300 may scale $I^{(0)}(i,j)$ by >>shift 2, and scale $I^{(1)}$ by >>shift2, as described above. Therefore, in some examples, the manner in which video encoder 200 and video decoder 300 determine sbDistTh may be modified to account for the >>shift2 scaling.

The equation of (3-1-1-2) in the second aspect to calculate sbDistTh is modified as follows:

$$sbDistTh = (sbWidth \cdot sbHeight \cdot s) \ll (n - shift2) \qquad (3\text{-}2\text{-}2)$$

In the above equation, n and s are predetermined values. For example, n can be derived as: n=InternalBitDepth−bitDepth+1. In the above equation, s represents a scale factor, e.g. s=1. In the current version of VVC, the InternalBitDepth is equal to 14 at bitDepth 10, therefore, n is equal to 5. The scale s may be 1, 2, 3 other predefined values, or signalled in the bitstream.

Accordingly, to determine the threshold value, video encoder 200 and video decoder 300 may be configured to multiply a width of a first sub-block of the one or more sub-blocks (i.e., sbWidth in equation 3-2-2), a height of the first sub-block of the one or more sub-blocks (i.e., sbHeight in equation 3-2-2), and a first scale factor (i.e., "s" in equation 3-2-2) to generate an intermediate value. Video encoder 200 and video decoder 300 may be configured to perform a left-shift operation on the intermediate value based on a second scale factor to generate a threshold value.

For example, the second scale factor may be (n−shift2) in equation 3-2-2, and the left-shift operation is shown as "<<" in equation 3-2-2.

In one or more examples, video encoder 200 and video decoder 300 may compare a distortion value for the first sub-block (e.g., a distortion value calculated using the alternative technique for determining the distortion value) with the threshold value (e.g., sbDistTh as determined in equation 3-2-2). Video encoder 200 and video decoder 300 may determine that one of per-pixel BDOF is performed or BDOF is bypassed for the first sub-block based on the comparison. For instance, if the distortion value is less than the threshold value (e.g., YES of 1306 in FIG. 13), video encoder 200 and video decoder 300 may bypass BDOF. If the distortion value is greater than the threshold value (e.g., NO of 1306 in FIG. 13), video encoder 200 and video decoder 300 may perform per-pixel BDOF.

A fourth aspects relates to determining the values of thW and thH. As in above aspects, the example techniques may be applied to a bi-predicted coding block. The total number of sub-blocks is derived from the width and height of the current block and the maximum sub-block width (thW) and height (thH) of sub-block.

When the current coding block applies a sub-block based method, e.g. DMVR, the values of thW and thH should be equal or smaller than the maximum sub-block width and height of the preceded method (e.g., DMVR).

The values of thW and thH can be fix predetermined values, e.g. thW is equal to 8, thH is equal to 8. The values of thW and thH can be adaptive and the values are determined by the decoded information from the bitstream. The following describe ways for the values of thW and thH to be adaptive:

a. Determined by the preceded coding method: If the current coding block applies a sub-block bases method, the thW and thH can be set to the same sub-block dimension as the preceded method. E.g. when DMVR is applied to the current coding block, thW is set to be equal to DMVR maximum subblock width, e.g. 16, thH is set to be equal to DMVR maximum subblock height, e.g. 16. Otherwise, (if the current coding block does not apply any sub-block based method), the thW and thH can be set to the predetermined values, e.g. 8.
b. Determined by the current coding block dimension: In this example, a bigger value of thW and thH is set to a coding block which has total number of luma samples greater than a threshold T (e.g. T=128). Given a W×H coding block: If W*H is greater than T, set the value of thW and thH equal to 16. Otherwise (if W*H is equal or smaller than T), set the value of thW and thH equal to 8.

A fifth aspect relates to an example decoder process of applying per-pixel BDOF with sub-block bypass. The above aspects can be applied in an encoder (e.g., video encoder 200) and/or decoder (e.g., video decoder 300). A decoder (e.g., video decoder 300) may execute the methods described here by all or a subset of the following steps to decode an inter predicted block in a picture from a bitstream:

1. Derive a position component (cbX, cbY) as the top-left luma position of the current block by decoding syntax elements in the bitstream.
2. Derive a size of the current block as a width value W and a height value H by decoding syntax elements in the bitstream.
3. Determine that the current block is an inter predicted block from decoding elements in the bitstream.
4. Derive the motion vector components (mvL0 and mvL1) and reference indices (refPicL0 and refPicL1) of the current block from decoding elements in the bitstream.
5. Infer a flag from decoding elements in the bitstream, wherein the flag indicates whether the decoder-side motion vector derivation (e.g., DMVR, bilateral merge, template matching) is applied to the current block or not. The inference scheme of the flag can be the same as but not limited to examples described above with respect to enabling condition for when DMVR is enabled. In another example, this flag can be explicitly signal in the bitstream to avoid complex condition check at decoder.
6. If decided to apply DMVR to the current block, derive the refined motion vectors.
7. Derive two (W+6)×(H+6) luma prediction sample arrays predSampleL0 and predSampleL1 from the decoded refPicL0, refPicL1 and motion vectors, wherein, if decided to apply DMVR, the motion vectors are the refined motion vectors, otherwise, the motion vectors are mvL0, mvL1.
8. Infer a flag from decoding elements in the bitstream, wherein the flag indicates whether the bi-directional optical flow is applied to the current block or not. The inference scheme of the flag can be the same as but not limited to bi-directional optical flow. In another example, this flag can be explicitly signal in the bitstream to avoid complex condition check at decoder.
9. According to the aforementioned flag value, if the decision is to apply BDOF to the current block, derive number of subblocks in horizontal direction numSbX and in vertical direction numSbY, the subblock width sbWidth and height sbHeight as follows:

$$\text{numSbX}=(W>thW)?(W/thW):1$$

$$\text{numSbY}=(H>thH)?(H/thH):1$$

$$\text{sbWidth}=(W>thW)?thW:W$$

$$\text{sbHeight}=(H>thH)?thH:H$$

wherein, thW and thH are predetermined integer value (e.g. thW=thH=8)

10. Derive a variable sbDistTh as:

$$\text{sbDistTh}=\text{sbWidth}*\text{sbHeight}*s<<(n-\text{shift2})$$

wherein,
shift2 is a predetermined value, e.g. shift2 is equal to 4
n is a predetermined value, e.g. n=InternalBitDepth−bitDepth+1=5
s is a scale factor, e.g. s=1

11. Set a position component (sbX, sbY)=(0, 0) as the top-left luma position of the first sub-block of the current block.
12. For each subblock at (sbX, sbY), when sbX is less than W and sbY is less than H, the following steps apply.

12.1. For x=sbX−2 . . . sbX+sbWidth+1, y=sbY−2 . . . sbY+sbHeight+1, the variables diff[x][y] are derived as:

$$\text{diff}[x][y]=(\text{predSamplesL0}[x][y]>>\text{shift2})-(\text{predSamplesL1}[x][y]>>\text{shift2})$$

wherein, shift2 is a predetermined value, e.g. shift2 is equal to 4

12.2. Derive a variable sbDist as:

$$\text{sbDist}=\Sigma_i\Sigma_j\text{Abs}(\text{diff}[sbX+i][sbY+j])$$

wherein, i=0 sbWidth−1, j=0 sbHeight−1

12.3. (Bypass subblock BDOF) if sbDist is less than sbDistTh, derive the prediction signal of the sub-block as follows, 12.3.1. For x=sbX sbX+sbWidth−1, y=sbY sbY+sbHeight−1, $$\text{predSamples}[x+cbX][y+cbY]=\text{Clip3}(0,(2^{BitDepth})-1,(\text{predSamplesL0}[x][y]+\text{predSamplesL1}[x][y]+\text{offset5})>>\text{shift5})$$

wherein, shift5 is set to equal to Max(3, 15−BitDepth)

offset5 is set equal to (1<<(shift5−1))

12.4. Otherwise (if sbDist is equal or greater than sbDistTh), the following steps apply.

12.4.1. For x=sbX−2 . . . sbX+sbWidth+1, y=sbY−2 . . . sbY+sbHeight+1, the variables gradientHL0[x][y], gradientVL0[x][y], gradientHL1[x][y] and gradientVL1[x][y] are derived as follows:

$$\text{gradientHL0}[x][y]=(\text{predSamplesL0}[x+1][y]>>\text{shift1})-(\text{predSamplesL0}[x-1][y]>>\text{shift1})$$

$$\text{gradientVL0}[x][y]=(\text{predSamplesL0}[x][y+1]>>\text{shift1})-(\text{predSamplesL0}[x][y-1]>>\text{shift1})$$

$$\text{gradientHL1}[x][y]=(\text{predSamplesL1}[x+1][y]>>\text{shift1})-(\text{predSamplesL1}[x-1][y]>>\text{shift1})$$

$$\text{gradientVL1}[x][y]=(\text{predSamplesL1}[x][y+1]>>\text{shift1})-(\text{predSamplesL1}[x][y-1]>>\text{shift1})$$

wherein, shift1 is a predetermined value, e.g. shift1 is set to equal to 6

12.4.2. For x=sbX−2 . . . sbX+sbWidth+1,y=sbY−2 . . . sbY+sbHeight+1, the variables tempH[x][y] and tempV[x][y] are derived as follows:

$$\text{temp}H[x][y]=(\text{gradientHL0}[x][y]+\text{gradientHL1}[x][y])>>\text{shift3}$$

$$\text{temp}V[x][y]=(\text{gradientVL0}[x][y]+\text{gradientVL1}[x][y])>>\text{shift3}$$

wherein, shift3 is a predetermined value, e.g. shift3 is set to equal to 1

12.4.3. For each pixel at (piX, piY), wherein, piX=sbX sbX+sbWidth−1, piY=sbY sbY+sbHeight−1, the following steps apply.

12.4.3.1. The variables sGx2, sGy2, sGxGy, sGxdI and sGydI are derived as follows:

$$sGx2=\Sigma_i\Sigma_j\,\text{Abs}(\text{temp}H[\text{piX}+i][\text{piY}+j])$$

$$sGy2=\Sigma_i\Sigma_j\,\text{Abs}(\text{temp}V[\text{piX}+i][\text{piY}+j])$$

$$sGxGy=\Sigma_i\Sigma_j(\text{Sign}(\text{temp}V[\text{piX}+i][\text{piY}+j])*\text{temp}H[\text{piX}+i][\text{piY}+j])$$

$$sGxdI=\Sigma_i\Sigma_i(-\text{Sign}(\text{temp}H[\text{piX}+i][\text{piY}+j])*\text{diff}[\text{piX}+i][\text{piY}+j])$$

$$sGydI=\Sigma_i\Sigma_i(-\text{Sign}(\text{temp}V[\text{piX}+i][\text{piY}+j])*\text{diff}[\text{piX}+i][\text{piY}+j])$$

wherein, i=−2 . . . 2, j=−2 . . . 2

12.4.3.2. The horizontal and vertical motion offset of the current pixel are derived as:

$$v_x=sGx2>0?\text{Clip3}(-\text{mvRefineThres}+1,\text{mvRefineThres}-1,(sGxdI<<2)>>\text{Floor}(\text{Log 2}(sGx2))):0$$

$$v_y=sGy2>0?\text{Clip3}(-\text{mvRefineThres}+1,\text{mvRefineThres}-1,((sGydI<<2)-((v_x*sGxGy)>>1))>>\text{Floor}(\text{Log 2}(sGy2))):0$$

wherein, mvRefineThres is a predetermined value, e.g. mvRefineThres is set to equal to (1<<4)

12.4.3.3. The prediction signal of the current pixel is derived as follows:

$$\text{bdofOffset}=v_x*(\text{gradientHL0}[\text{piX}][\text{piY}]-\text{gradientHL1}[\text{pi X}][\text{piY}])+v_y*(\text{gradientVL0}[\text{piX}][\text{piY}]-\text{gradientVL1}[\text{piX}][\text{piY}])$$

$$\text{predSamples}[\text{piX}+\text{cbW}][\text{piY}+cbY]=\text{Clip3}(0,(2^{BitDePth})-1,(\text{predSamplesL0}[\text{xPix}][\text{yPix}]+\text{predSamplesL1}[\text{xPix}][\text{yPix}]+\text{bdofOffset}+\text{offset5})>>\text{shift5})$$

wherein, shift5 is set to equal to Max(3, 15−BitDepth), offset5 is set equal to (1<<(shift5−1)).

12.5. update the subblock top-left luma position as follows:

$$sbX=(sbX+\text{sbWidth})<W?sbX+\text{sbWidth}:0$$

$$sbY=(sbX+\text{sbWidth})<W?sbY:sbY+\text{sbHeight}$$

Figure 15:
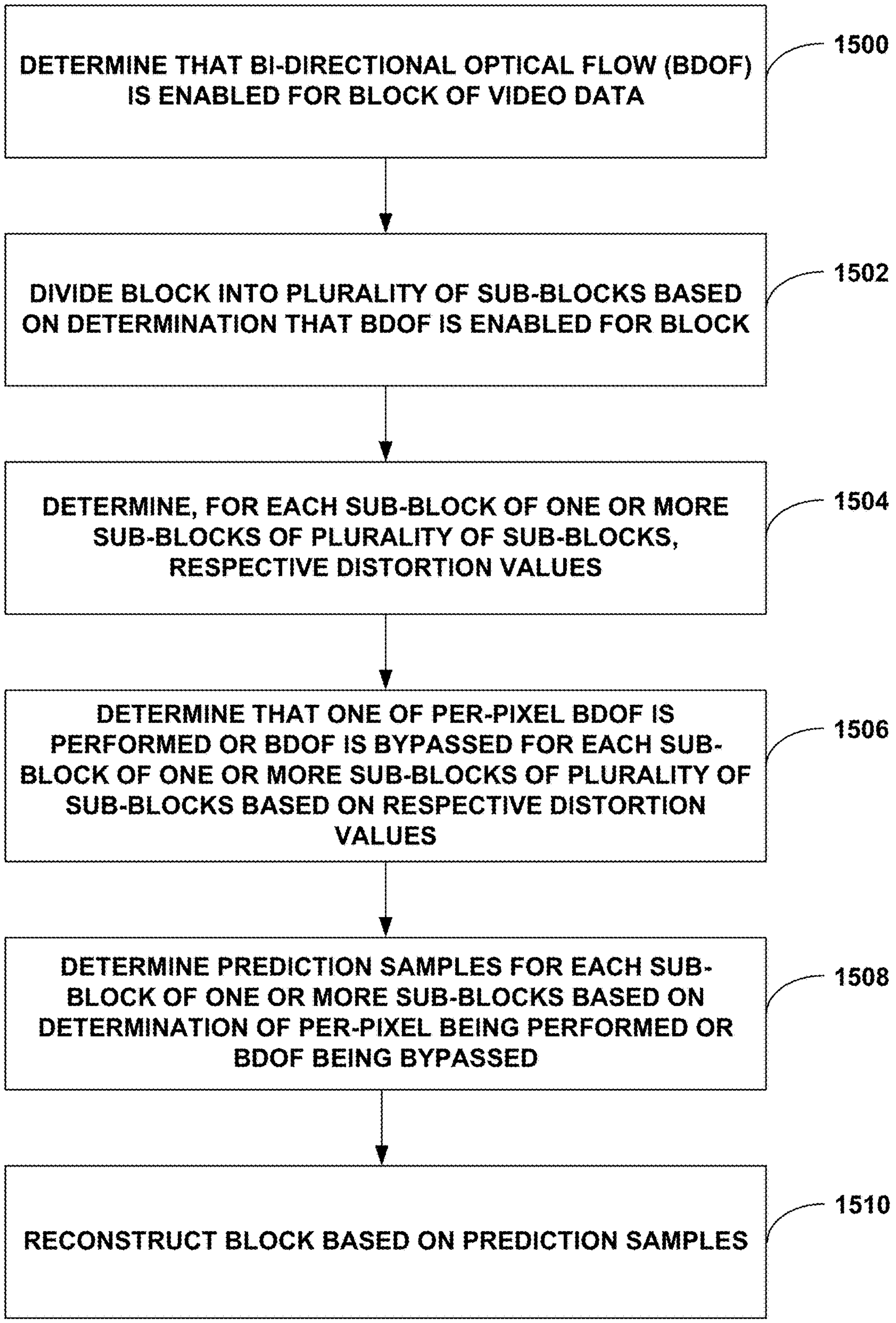
FIG. 15 is a flowchart illustrating an example method for decoding a current block in accordance with the techniques of this disclosure.

13. Derive the predicted block using the derived prediction signal of each subblock, use the derived predicted block for video decoding FIG. 15 is a flowchart illustrating an example method for decoding video data in accordance with the techniques of this disclosure. The current block may comprise a current CU. Although described with respect to video decoder 300 (FIGS. 1 and 4), it should be understood that other devices may be configured to perform a method similar to that of FIG. 15. For example, prediction processing unit 304 and/or motion compensation unit 316 may be configured to perform the example techniques of FIG. 15. Prediction processing unit 304 and/or motion compensation unit 316 may be coupled to memory such as DPB 314, or other memory of video decoder 300. In some examples, video decoder 300 may be coupled to memory 120 that stores information used by video decoder 300 for performing the example techniques of FIG. 15.

Video decoder 300 may determine that bi-directional optical flow (BDOF) is enabled for a block of the video data (1500). For example, video decoder 300 may receive signaling indicating that BDOF is enabled for the block. In some examples, video decoder 300 may infer (e.g., determine without receiving signaling) that BDOF is enabled for the block, such as based on certain criteria being satisfied.

Video decoder 300 may divide the block into a plurality of sub-blocks based on the determination that BDOF is enabled for the block (1502). For example, video decoder 300 may divide the block into N sub-blocks. In some cases, two or more of the sub-blocks may be different sizes, but it is possible for the sub-blocks to have the same size. Video decoder 300 may determine how to divide the block based on signaled information or by inference.

Video decoder 300 may determine, for each sub-block of one or more sub-blocks of the plurality of sub-blocks, respective distortion values (1504). There may be various ways in which video decoder 300 may determine respective distortion values. As one example, video decoder 300 may determine a first reference block (e.g., $I^{(0)}(i,j)$) and determine a second reference block (e.g., $I^{(1)}(i,j)$. Video decoder 300 may calculate a sum of absolute difference (SAD) between $I^{(0)}(i,j)$ and $I^{(1)}(i,j)$.

However, the example techniques are not so limited. In some examples, video decoder 300 may perform the alternative technique to determine the distortion value, as described above. For example, video decoder 300 may determine a first set of sample values in a first reference block for a first sub-block of the one or more sub-blocks (e.g., determine $I^{(0)}(i,j)$). Video decoder 300 may scale the first set of sample values with a scale factor to generate a first set of scaled sample values (e.g., determine $I^{(0)}(i,j)$ shift2 to generate the first set of scaled sample values). Video decoder 300 may determine a second set of sample values in a second reference block for the first sub-block of the one or more sub-blocks (e.g., determine $I^{(1)}(i,j)$). Video decoder 300 may scale the second set of sample values with the scale factor to generate a second set of scaled sample values (e.g., determine $I^{(1)}(i,j)<<\text{shift2}$ to generate the second set of scaled samples values). In one or more examples, to determine, for each sub-block of one or more sub-blocks of the plurality of sub-blocks, the respective distortion values, video decoder 300 may be configured to determine, for the first sub-block, a distortion value of the respective distortion values based on the first set of scaled sample values and the second set of scaled sample values (e.g., determine the SAD based on the first set of scaled sample values and the second set of scaled sample values).

Video decoder 300 may determine that one of per-pixel BDOF is performed or BDOF is bypassed for each sub-block of the one or more sub-blocks of the plurality of sub-blocks based on the respective distortion values (1506). For instance, as described with respect to FIG. 13, for video decoder 300 there may be two options, either perform per-pixel BDOF or bypass BDOF for the sub-block. In some examples, there may be no other option for video decoder 300 when evaluating a sub-block.

In some examples, to determine whether to perform per-pixel BDOF or bypass BDOF, video encoder 200 and video decoder 300 may determine a threshold value. One example way to determine the threshold value is $\text{sbDistTh}=(\text{sbWidth}\cdot\text{sbHeight}\cdot s)<<n$. However, in examples where the alternative technique for determining the distortion value is utilized, video decoder 300 may determine the threshold value as $\text{sbDistTh}=(\text{sbWidth}\cdot\text{sbHeight}\cdot s)<<(n-\text{shift2})$.

That is, video decoder 300 may multiplying a width of a first sub-block of the one or more sub-blocks (e.g., sbWidth), a height of the first sub-block of the one or more sub-blocks (e.g., sbHeight), and a first scale factor (e.g., "s") to generate an intermediate value. Video decoder 300 may performing a left-shift operation on the intermediate value based on a second scale factor to generate a threshold value (e.g., perform $<<(n-\text{shift2})$, where $(n-\text{shift2})$ is the second scale factor).

Video decoder 300 may compare a distortion value of the respective distortion values for the first sub-block with the threshold value. To determine that one of per-pixel BDOF is performed or BDOF is bypassed for each sub-block of the one or more sub-blocks of the plurality of sub-blocks based on the respective distortion values, video decoder 300 may determine that one of per-pixel BDOF is performed or BDOF is bypassed for the first sub-block based on the comparison, such as illustrated in decision block 1306 of FIG. 13.

Video decoder 300 may be configured to determine prediction samples for each sub-block of the one or more sub-blocks based on the determination of per-pixel BDOF being performed or BDOF being bypassed (1508). As an example, for determining prediction samples, video decoder 300 may determine that per-pixel BDOF is performed for a first sub-block of the one or more sub-blocks. In this example, video decoder 300 may determine, for each sample in the first sub-block, respective motion refinements, and may determine, for each sample in the first sub-block, respective refined sample values from samples in a prediction block for the first sub-block based on the respective motion refinements.

For example, video decoder 300 may perform the operations of $\text{Pred}_{BDOF}(x, y)=)(I^{(0)}(x, y)+I^{(1)}(x, y)+b'(x, y)+o_{offset})>>\text{shift5}$. The $\text{pred}_{BD}o_F$ may represent the refined sample values. In this example, $I^{(0)}(x,y)+I^{(1)}(x,y)$ may be considered as the prediction block. The value for $b'(x,y)$ may be determined by the respective motion refinements $(v'_x, v'_y)$ for each sample in the sub-block. Therefore, the respective refine sample values (e.g., $\text{pred}_{BDOF}$) are based on the prediction block and the respective motion refinements.

There may be various ways in which to determine the motion refinements $(v'_x, v'_y)$. As part of determining the motion refinements, video decoder 300 may determine auto- and cross-correlation, including $\theta(i,j)=)(I^{(0)}(i,j)>>\text{shift2})-(I^{(1)}(i,j)>>\text{shift2})$. In one or more examples, such as where the alternative technique for determining the distortion values is used, video decoder 300 may have already determined $(I^{(0)}(i, j)>>\text{shift2})-(I^{(1)}(i,j)>>\text{shift2})$ for determining the distortion value for the first sub-block. In such examples, video decoder 300 may reuse the first set of scaled sample values (e.g., $I^{(0)}(i,j)>>\text{shift2}$) and the second set of scaled sample values (e.g., $I^{(1)}(i,j)>>\text{shift2}$) for determining per-pixel motion refinement for per-pixel BDOF (e.g., the value for $\theta(i,j)$ can be determined without recalculating $I^{(0)}(i,j)>>\text{shift2}$ and $I^{(1)}(i,j)>>\text{shift2}$).

Video decoder 300 may reconstruct the block based on the prediction samples (1510). For example, reconstructing the block based on the prediction samples may include video decoder 300 receiving residual values indicative of a difference between the prediction samples and samples of the block, and adding the residual values to the prediction samples to reconstruct the block.

The above provides examples with respect to respective sub-blocks of a block. The following is an example where there are two sub-blocks, and where per-pixel BDOF is performed for one sub-block, and BDOF is bypassed for the other sub-block.

For example, for a first sub-block of the one or more sub-blocks, video decoder 300 may determine a first distortion value of the respective distortion values, and for a second sub-block of the one or more sub-blocks, video decoder 300 may determine a second distortion value of the respective distortion values.

For the first sub-block of the plurality of sub-blocks, video decoder 300 may determine that BDOF is enabled for the first sub-block based on the first distortion value (e.g., based on comparison of first distortion value to a threshold value). Based on the determination that BDOF is enabled for the first sub-block, video decoder 300 may determine per-pixel motion refinement for refining a first set of prediction samples for the first sub-block. For example, video decoder 300 may, for a first sample of the first sub-block, derive a first motion refinement for refining a first prediction sample, for a second sample of the first sub-block, derive a second motion refinement for refining a second prediction sample, and so forth.

For the second sub-block of the plurality of sub-blocks, video decoder 300 may determine that BDOF is bypassed based on the second distortion value (e.g., based on comparison of the second distortion value to the threshold value). Based on the determination that BDOF is bypassed for the second block, video decoder 300 may bypass determining per-pixel motion refinement for refining a second set of prediction samples for the second sub-block. For example, video decoder 300 may, for a first sample of the first sub-block, bypass derivation of a first motion refinement for refining a first prediction sample, for a second sample of the first sub-block, bypass derivation of a second motion refinement for refining a second prediction sample, and so forth.

For the first sub-block, video decoder 300 may determine the refined first set of prediction samples of the first sub-block based on the per-pixel motion refinement for the first sub-block (e.g., determine $pred_{BDOF}$ using the example techniques described in this disclosure). For the second sub-block, video decoder 300 may determine the second set of prediction samples without refining the second set of prediction samples based on the per-pixel motion refinement for refining the second set of prediction samples. That is, for the second sub-block, BDOF is bypassed. Video decoder 300 may determine prediction samples for the second sub-block based on various techniques, such as determining a prediction block based on weighted average of the reference blocks.

Figure 16:
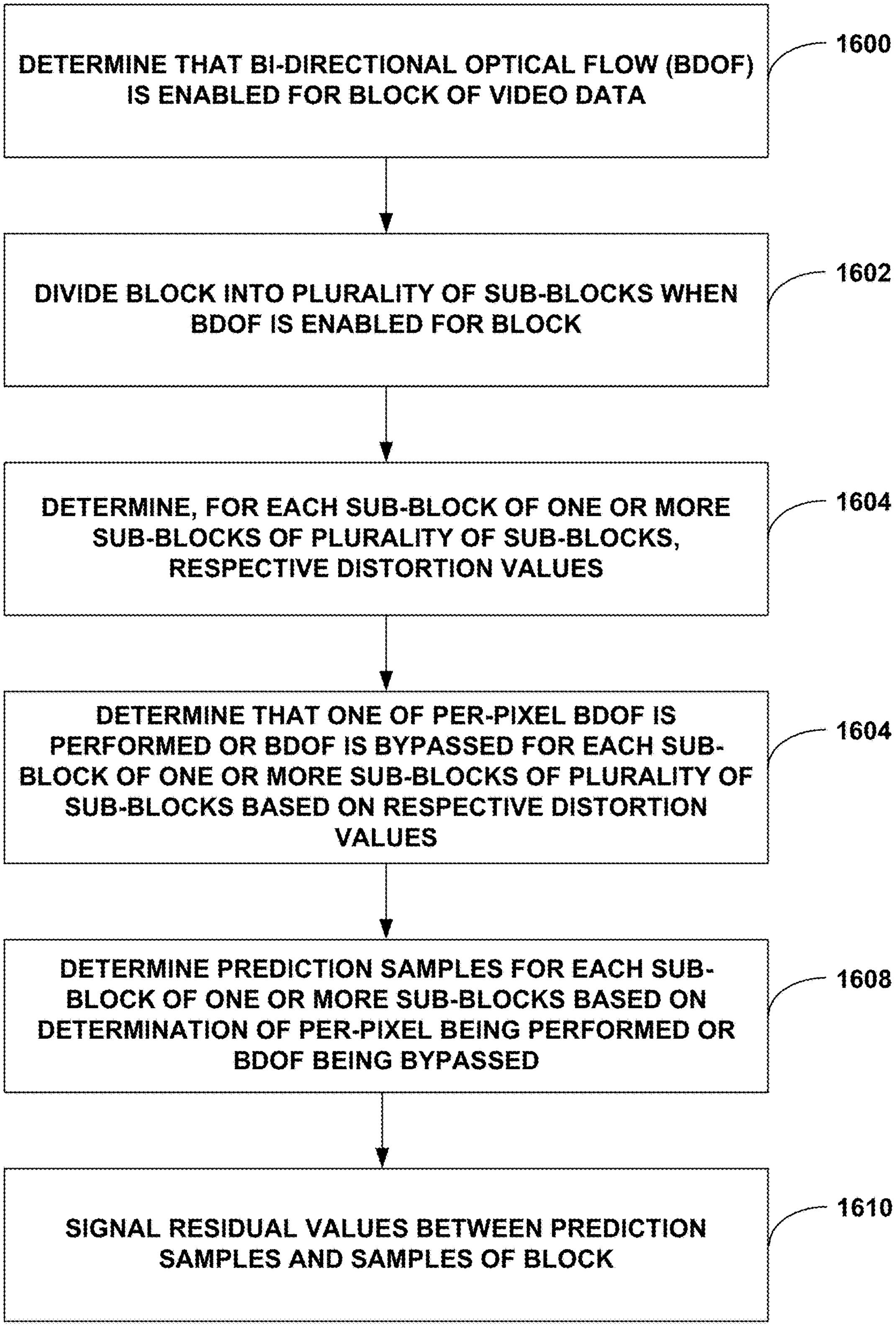
FIG. 16 is a flowchart illustrating an example method for encoding a current block in accordance with the techniques of this disclosure.

FIG. 16 is a flowchart illustrating an example method of encoding video data in accordance with the techniques of this disclosure. The current block may comprise a current CU. Although described with respect to video encoder 200 (FIGS. 1 and 3), it should be understood that other devices may be configured to perform a method similar to that of FIG. 16. For example, motion selection unit 202 and/or motion compensation unit 224 may be configured to perform the example techniques of FIG. 16. Motion selection unit 202 and/or motion compensation unit 224 may be coupled to memory such as DPB 218, or other memory of video encoder 200. In some examples, video encoder 200 may be coupled to memory 106 that stores information used by video encoder 200 for performing the example techniques of FIG. 16. In general, video encoder 200 may perform the same operations as video decoder 300 for generating the prediction samples.

Video encoder 200 may determine that bi-directional optical flow (BDOF) is enabled for a block of the video data (1600). For example, video encoder 200 may determine the rate-distortion costs associated with different coding modes, and based on the rate-distortion costs may determine that the BDOF is enabled for the block.

Video encoder 200 may divide the block into a plurality of sub-blocks when BDOF is enabled for the block (1602). Video encoder 200 may determine, for each sub-block of the one or more sub-blocks of the plurality of sub-blocks, respective distortion values (1604). Video encoder 200 may perform the same techniques as those described for video decoder 300 to determine the respective distortion values.

Video encoder 200 may determine that one of per-pixel BDOF is performed or BDOF is bypassed for each sub-block of the one or more sub-blocks of the plurality of sub-blocks based on the respective distortion values (1606). For instance, because video encoder 200 may not signal information indicating whether per-pixel BDOF is performed or BDOF is bypassed, video encoder 200 may perform the same operations as video decoder 300 to determine whether per-pixel BDOF is performed or BDOF is bypassed for each sub-block.

Video encoder 200 may determine prediction samples for each sub-block of the one or more sub-blocks based on the determination of per-pixel BDOF being performed or BDOF being bypassed (1608). Video encoder 200 may signal residual values between prediction samples and samples of the block (e.g., respective sub-blocks) (1610).

The following describes some example techniques that may be applied together or separately.

Clause 1. A method of decoding video data, the method comprising: determining that bi-directional optical flow (BDOF) is enabled for a block of the video data; dividing the block into a plurality of sub-blocks based on the determination that BDOF is enabled for the block; determining, for each sub-block of one or more sub-blocks of the plurality of sub-blocks, respective distortion values; determining that one of per-pixel BDOF is performed or BDOF is bypassed for each sub-block of the one or more sub-blocks of the plurality of sub-blocks based on the respective distortion values; determining prediction samples for each sub-block of the one or more sub-blocks based on the determination of per-pixel BDOF being performed or BDOF being bypassed; and reconstructing the block based on the prediction samples.

Clause 2. The method of clause 1, wherein determining, for each sub-block of one or more sub-blocks of the plurality of sub-blocks, respective distortion values comprises: for a first sub-block of the one or more sub-blocks, determining a first distortion value of the respective distortion values; and for a second sub-block of the one or more sub-blocks, determining a second distortion value of the respective distortion values, wherein determining that one of per-pixel BDOF is performed or BDOF is bypassed for each sub-block of the one or more sub-blocks of the plurality of sub-blocks based on the respective distortion values comprises: for the first sub-block of the plurality of sub-blocks, determining that BDOF is enabled for the first sub-block based on the first distortion value; based on the determination that BDOF is enabled for the first sub-block, determining per-pixel motion refinement for refining a first set of prediction samples for the first sub-block; for the second sub-block of the plurality of sub-blocks, determining that BDOF is bypassed based on the second distortion value; and based on the determination that BDOF is bypassed for the second block, bypassing determining per-pixel motion refinement for refining a second set of prediction samples for the second sub-block, and wherein determining the prediction samples for each sub-block of the one or more sub-blocks based on the determination of per-pixel BDOF being performed or BDOF being bypassed comprises: for the first sub-block, determining the refined first set of prediction samples of the first sub-block based on the per-pixel motion refinement for the first sub-block; and for the second sub-block, determining the second set of prediction samples without refining the second set of prediction samples based on the per-pixel motion refinement for refining the second set of prediction samples.

Clause 3. The method of any of clauses 1 and 2, wherein determining that one of per-pixel BDOF is performed or BDOF is bypassed for each sub-block of the one or more sub-blocks of the plurality of sub-blocks based on the respective distortion values comprises determining that per-pixel BDOF is performed for a first sub-block of the one or more sub-blocks, the method further comprising determining, for each sample in the first sub-block, respective motion refinements, and wherein determining the prediction samples for each sub-block of the one or more sub-blocks based on the determination of per-pixel BDOF being performed or BDOF being bypassed comprises determining, for each sample in the first sub-block, respective refined sample values from samples in a prediction block for the first sub-block based on the respective motion refinements.

Clause 4. The method of any of clauses 1-3, further comprising: multiplying a width of a first sub-block of the one or more sub-blocks, a height of the first sub-block of the one or more sub-blocks, and a first scale factor to generate an intermediate value; performing a left-shift operation on the intermediate value based on a second scale factor to generate a threshold value; and comparing a distortion value of the respective distortion values for the first sub-block with the threshold value, wherein determining that one of per-pixel BDOF is performed or BDOF is bypassed for each sub-block of the one or more sub-blocks of the plurality of sub-blocks based on the respective distortion values comprises determining that one of per-pixel BDOF is performed or BDOF is bypassed for the first sub-block based on the comparison.

Clause 5. The method of any of clauses 1-4, further comprising: determining a first set of sample values in a first reference block for a first sub-block of the one or more sub-blocks; scaling the first set of sample values with a scale factor to generate a first set of scaled sample values; determining a second set of sample values in a second reference block for the first sub-block of the one or more sub-blocks; and scaling the second set of sample values with the scale factor to generate a second set of scaled sample values, wherein determining, for each sub-block of one or more sub-blocks of the plurality of sub-blocks, the respective distortion values comprises determining, for the first sub-block, a distortion value of the respective distortion values based on the first set of scaled sample values and the second set of scaled sample values.

Clause 6. The method of clause 5, wherein determining that one of per-pixel BDOF is performed or BDOF is bypassed for each sub-block of the one or more sub-blocks of the plurality of sub-blocks based on the respective distortion values comprises determining that per-pixel BDOF is performed for the first sub-block, the method further comprising reusing the first set of scaled sample values and the second set of scaled sample values for determining per-pixel motion refinement for per-pixel BDOF.

Clause 7. The method of clause 5, wherein determining that one of per-pixel BDOF is performed or BDOF is bypassed for each sub-block of the one or more sub-blocks of the plurality of sub-blocks based on the respective distortion values comprises determining that per-pixel BDOF is performed for the first sub-block, the method further comprising reusing the first set of scaled sample values and the second set of scaled sample values for determining motion refinement for BDOF.

Clause 8. The method of any of clauses 1-7, wherein reconstructing the block comprises: receiving residual values indicative of a difference between the prediction samples and samples of the block; and adding the residual values to the prediction samples to reconstruct the block.

Clause 9. A device for decoding video data, the device comprising: memory configured to store the video data; and processing circuitry coupled to the memory and configured to: determine that bi-directional optical flow (BDOF) is enabled for a block of the video data; divide the block into a plurality of sub-blocks based on the determination that BDOF is enabled for the block; determine, for each sub-block of one or more sub-blocks of the plurality of sub-blocks, respective distortion values; determine that one of per-pixel BDOF is performed or BDOF is bypassed for each sub-block of the one or more sub-blocks of the plurality of sub-blocks based on the respective distortion values; determine prediction samples for each sub-block of the one or more sub-blocks based on the determination of per-pixel BDOF being performed or BDOF being bypassed; and reconstruct the block based on the prediction samples.

Clause 10. The device of clause 9, wherein to determine, for each sub-block of one or more sub-blocks of the plurality of sub-blocks, respective distortion values, the processing circuitry is configured to: for a first sub-block of the one or more sub-blocks, determine a first distortion value of the respective distortion values; and for a second sub-block of the one or more sub-blocks, determine a second distortion value of the respective distortion values, wherein to determine that one of per-pixel BDOF is performed or BDOF is bypassed for each sub-block of the one or more sub-blocks of the plurality of sub-blocks based on the respective distortion values, the processing circuitry is configured to: for the first sub-block of the plurality of sub-blocks, determine that BDOF is enabled for the first sub-block based on the first distortion value; based on the determination that BDOF is enabled for the first sub-block, determine per-pixel motion refinement for refining a first set of prediction samples for the first sub-block; for the second sub-block of the plurality of sub-blocks, determine that BDOF is bypassed based on the second distortion value; and based on the determination that BDOF is bypassed for the second block, bypass determining per-pixel motion refinement for refining a second set of prediction samples for the second sub-block, and wherein to determine the prediction samples for each sub-block of the one or more sub-blocks based on the determination of per-pixel BDOF being performed or BDOF being bypassed, the processing circuitry is configured to: for the first sub-block, determine the refined first set of prediction samples of the first sub-block based on the per-pixel motion refinement for the first sub-block; and for the second sub-block, determine the second set of prediction samples without refining the second set of prediction samples based on the per-pixel motion refinement for refining the second set of prediction samples.

Clause 11. The device of any of clauses 9 and 10, wherein to determine that one of per-pixel BDOF is performed or BDOF is bypassed for each sub-block of the one or more sub-blocks of the plurality of sub-blocks based on the respective distortion values, the processing circuitry is configured to determine that per-pixel BDOF is performed for a first sub-block of the one or more sub-blocks, wherein the processing circuitry is further configured to determine, for each sample in the first sub-block, respective motion refinements, and wherein to determine the prediction samples for each sub-block of the one or more sub-blocks based on the determination of per-pixel BDOF being performed or BDOF being bypassed, the processing circuitry is configured to determine, for each sample in the first sub-block, respective refined sample values from samples in a prediction block for the first sub-block based on the respective motion refinements.

Clause 12. The device of any of clauses 9-11, wherein the processing circuitry is configured to: multiply a width of a first sub-block of the one or more sub-blocks, a height of the first sub-block of the one or more sub-blocks, and a first scale factor to generate an intermediate value; perform a left-shift operation on the intermediate value based on a second scale factor to generate a threshold value; and compare a distortion value of the respective distortion values for the first sub-block with the threshold value, wherein to determine that one of per-pixel BDOF is performed or BDOF is bypassed for each sub-block of the one or more sub-blocks of the plurality of sub-blocks based on the respective distortion values, the processing circuitry is configured to determine that one of per-pixel BDOF is performed or BDOF is bypassed for the first sub-block based on the comparison.

Clause 13. The device of any of clauses 9-12, wherein the processing circuitry is configured to: determine a first set of sample values in a first reference block for a first sub-block of the one or more sub-blocks; scale the first set of sample values with a scale factor to generate a first set of scaled sample values; determine a second set of sample values in a second reference block for the first sub-block of the one or more sub-blocks; and scale the second set of sample values with the scale factor to generate a second set of scaled sample values, wherein to determine, for each sub-block of one or more sub-blocks of the plurality of sub-blocks, the respective distortion values, the processing circuitry is configured to determine, for the first sub-block, a distortion value of the respective distortion values based on the first set of scaled sample values and the second set of scaled sample values.

Clause 14. The device of clause 13, wherein to determine that one of per-pixel BDOF is performed or BDOF is bypassed for each sub-block of the one or more sub-blocks of the plurality of sub-blocks based on the respective distortion values, the processing circuitry is configured to determine that per-pixel BDOF is performed for the first sub-block, wherein the processing circuitry is configured to reuse the first set of scaled samples values and the second set of scaled samples values for determining per-pixel motion refinement for per-pixel BDOF.

Clause 15. The device of clause 13, wherein to determine that one of per-pixel BDOF is performed or BDOF is bypassed for each sub-block of the one or more sub-blocks of the plurality of sub-blocks based on the respective distortion values, the processing circuitry is configured to determine that per-pixel BDOF is performed for the first sub-block, wherein the processing circuitry is configured to reuse the first set of scaled samples values and the second set of scaled samples values for determining motion refinement for BDOF.

Clause 16. The device of any of clauses 9-15, wherein to reconstruct the block, the processing circuitry is configured to: receive residual values indicative of a difference between the prediction samples and samples of the block; and add the residual values to the prediction samples to reconstruct the block.

Clause 17. The device of any of clauses 9-16, further comprising a display configured to display decoded video data.

Clause 18. The device of clauses 9-17, wherein the device comprises one or more of a camera, a computer, a mobile device, a broadcast receiver device, or a set-top box.

Clause 19. A computer-readable storage medium storing instructions thereon that when executed cause one or more processors to: determine that bi-directional optical flow (BDOF) is enabled for a block of video data; divide the block into a plurality of sub-blocks based on the determination that BDOF is enabled for the block; determine, for each sub-block of one or more sub-blocks of the plurality of sub-blocks, respective distortion values; determine that one of per-pixel BDOF is performed or BDOF is bypassed for each sub-block of the one or more sub-blocks of the plurality of sub-blocks based on the respective distortion values; determine prediction samples for each sub-block of the one or more sub-blocks based on the determination of per-pixel BDOF being performed or BDOF being bypassed; and reconstruct the block based on the prediction samples.

Clause 20. The computer-readable storage medium of clause 19, wherein the instructions that cause the one or more processors to determine, for each sub-block of one or more sub-blocks of the plurality of sub-blocks, respective distortion values comprise instructions that cause the one or more processors to: for a first sub-block of the one or more sub-blocks, determine a first distortion value of the respective distortion values; and for a second sub-block of the one or more sub-blocks, determine a second distortion value of the respective distortion values, wherein the instructions that cause the one or more processors to determine that one of per-pixel BDOF is performed or BDOF is bypassed for each sub-block of the one or more sub-blocks of the plurality of sub-blocks based on the respective distortion values comprise instructions that cause the one or more processors to: for the first sub-block of the plurality of sub-blocks, determine that BDOF is enabled for the first sub-block based on the first distortion value; based on the determination that BDOF is enabled for the first sub-block, determine per-pixel motion refinement for refining a first set of prediction samples for the first sub-block; for the second sub-block of the plurality of sub-blocks, determine that BDOF is bypassed based on the second distortion value; and based on the determination that BDOF is bypassed for the second block, bypass determining per-pixel motion refinement for refining a second set of prediction samples for the second sub-block, and wherein the instructions that cause the one or more processors to determine the prediction samples for each sub-block of the one or more sub-blocks based on the determination of per-pixel BDOF being performed or BDOF being bypassed comprise instructions that cause the one or more processors to: for the first sub-block, determine the refined first set of prediction samples of the first sub-block based on the per-pixel motion refinement for the first sub-block; and for the second sub-block, determine the second set of prediction samples without refining the second set of prediction samples based on the per-pixel motion refinement for refining the second set of prediction samples.

Clause 21. The computer-readable storage medium of any of clauses 19 and 20, wherein the instructions that cause the one or more processors to determine that one of per-pixel BDOF is performed or BDOF is bypassed for each sub-block of the one or more sub-blocks of the plurality of sub-blocks based on the respective distortion values comprise instructions that cause the one or more processors to determine that per-pixel BDOF is performed for a first sub-block of the one or more sub-blocks, the instructions further comprising instructions that cause the one or more processors to determine, for each sample in the first sub-block, respective motion refinements, and wherein the instructions that cause the one or more processors to determine the prediction samples for each sub-block of the one or more sub-blocks based on the determination of per-pixel BDOF being performed or BDOF being bypassed comprise instructions that cause the one or more processors to determine, for each sample in the first sub-block, respective refined sample values from samples in a prediction block for the first sub-block based on the respective motion refinements.

Clause 22. The computer-readable storage medium of clauses 19-21, further comprising instructions that cause the one or more processors to: multiply a width of a first sub-block of the one or more sub-blocks, a height of the first sub-block of the one or more sub-blocks, and a first scale factor to generate an intermediate value; perform a left-shift operation on the intermediate value based on a second scale factor to generate a threshold value; and compare a distortion value of the respective distortion values for the first sub-block with the threshold value, wherein the instructions that cause the one or more processors to determine that one of per-pixel BDOF is performed or BDOF is bypassed for each sub-block of the one or more sub-blocks of the plurality of sub-blocks based on the respective distortion values comprise instructions that cause the one or more processors to determine that one of per-pixel BDOF is performed or BDOF is bypassed for the first sub-block based on the comparison.

Clause 23. The computer-readable storage medium of any of clauses 19-22, further comprising instructions that cause the one or more processors to: determine a first set of sample values in a first reference block for a first sub-block of the one or more sub-blocks; scale the first set of sample values with a scale factor to generate a first set of scaled sample values; determine a second set of sample values in a second reference block for the first sub-block of the one or more sub-blocks; and scale the second set of sample values with the scale factor to generate a second set of scaled sample values, wherein the instructions that cause the one or more processors to determine, for each sub-block of one or more sub-blocks of the plurality of sub-blocks, the respective distortion values comprise instructions that cause the one or more processors to determine, for the first sub-block, a distortion value of the respective distortion values based on the first set of scaled sample values and the second set of scaled sample values.

Clause 24. A device for decoding video data, the device comprising: means for determining that bi-directional optical flow (BDOF) is enabled for a block of the video data; means for dividing the block into a plurality of sub-blocks based on the determination that BDOF is enabled for the block; means for determining, for each sub-block of one or more sub-blocks of the plurality of sub-blocks, respective distortion values; means for determining that one of per-pixel BDOF is performed or BDOF is bypassed for each sub-block of the one or more sub-blocks of the plurality of sub-blocks based on the respective distortion values; means for determining prediction samples for each sub-block of the one or more sub-blocks based on the determination of per-pixel BDOF being performed or BDOF being bypassed; and means for reconstructing the block based on the prediction samples.

Clause 25. A method of coding video data, the method comprising: dividing an input block into a plurality of sub-blocks, wherein a size of the input block is less than or equal to a size of a coding unit; determining that bi-directional optical flow (BDOF) is to be applied to a sub-block of the plurality of sub-blocks based on a condition being satisfied; dividing the sub-block into a plurality of sub-sub-blocks; determining a refined motion vector for one or more of the sub-sub-blocks, wherein the refine motion vector for a sub-sub-block of the one or more sub-sub-blocks is the same for a plurality of samples in the sub-sub-block; and performing BDOF for the sub-block based on the refined motion vector for the one or more sub-sub-blocks.

Clause 26. A method of coding video data, the method comprising: dividing an input block into a plurality of sub-blocks, wherein a size of the input block is less than or equal to a size of a coding unit; determining that bi-directional optical flow (BDOF) is to be applied to a sub-block of the plurality of sub-blocks based on a condition being satisfied; dividing the sub-block into a plurality of sub-sub-blocks; determining a refined motion vector for each of one or more samples in the sub-block; and performing BDOF for the sub-block based on the refined motion vector for each of the one or more samples in the sub-block.

Clause 27. The method of any of clauses 25 and 26, further comprising bypassing BDOF for the other sub-blocks of the plurality of sub-blocks.

Clause 28. The method of any of clauses 25-27, wherein the condition being satisfied includes a determination of whether sum of absolute difference (SAD) between two prediction signals in reference picture 0 and reference picture 1 are less than a threshold.

Clause 29. The method of any of clauses 25-28, wherein the size of the input block is thW×thH, wherein thW and thH are based on one or more of: a fixed, predetermined value; a value decoded from a bitstream; or based on a size of blocks used prior to BDOF in encoding or decoding the coding unit.

Clause 30. A method of coding video data, the method comprising any one or combination of clauses 25-29.

Clause 31. The method of any of clauses 25-30, wherein performing BDOF comprises performing BDOF as part of decoding the video data.

Clause 32. The method of any of clauses 25-31, wherein performing BDOF comprises performing BDOF as part of encoding the video data, including in a reconstruction loop of the encoding.

Clause 33. A device for coding video data, the device comprising: memory to store video data; and processing circuitry coupled to the memory, wherein the processing circuitry is configured to perform any one or combination of clauses 25-32.

Clause 34. A device for coding video data, the device comprising one or more means for performing the method of any of clauses 25-32.

Clause 35. The device of any of clauses 33 and 34, further comprising a display configured to display decoded video data.

Clause 36. The device of any of clauses 33-35, wherein the device comprises one or more of a camera, a computer, a mobile device, a broadcast receiver device, or a set-top box.

Clause 37. The device of any of clauses 33-36, wherein the processing circuitry or the means for performing comprises a video decoder.

Clause 38. The device of any of clauses 33-37, wherein the processing circuitry or the means for performing comprises a video encoder.

Clause 39. A computer-readable storage medium having stored thereon instructions that, when executed, cause one or more processors to perform the method of any of clause 25-32.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining that block-level bi-directional optical flow (BDOF) is enabled for a block of the video data;

dividing the block into a plurality of sub-blocks based on the determination that block-level BDOF is enabled for the block;

determining a first set of sample values in a first reference block for a first sub-block of the plurality of sub-blocks;

scaling the first set of sample values with a scale factor to generate a first set of scaled sample values;

determining a second set of sample values in a second reference block for the first sub-block of the plurality of sub-blocks;

scaling the second set of sample values with the scale factor to generate a second set of scaled sample values;

determining, for each sub-block of one or more sub-blocks of the plurality of sub-blocks, respective distortion values, wherein determining, for each sub-block of the one or more sub-blocks of the plurality of sub-blocks, the respective distortion values comprises determining, for the first sub-block, a first distortion value of the respective distortion values based on the first set of scaled sample values and the second set of scaled sample values;

determining, for each sub-block of the one or more sub-blocks of the plurality of sub-blocks and based on the respective distortion values, between applying per-pixel BDOF and bypassing BDOF, wherein a process of applying, based on a determination to apply per-pixel BDOF to a sub-block of the one or more sub-blocks, per-pixel BDOF comprises applying a first motion refinement vector to a first pixel in the sub-block and applying a second motion refinement vector to a second pixel in the sub-block where the first motion refinement vector and the second motion refinement vector are different, wherein determining between applying per-pixel BDOF and bypassing BDOF for each sub-block of the one or more sub-blocks of the plurality of sub-blocks based on the respective distortion values comprises determining that per-pixel BDOF is to be applied for the first sub-block based on the first distortion value;

determining prediction samples for each sub-block of the one or more sub-blocks based on the determination between applying per-pixel BDOF and bypassing BDOF, wherein determining prediction samples comprises, for the first sub-block, reusing the first set of scaled sample values and the second set of scaled sample values for determining per-pixel motion refinement for per-pixel BDOF for refining a first set of prediction samples for the first sub-block to generate a refined first set of prediction samples, and determining the prediction samples for the first sub-block based on the refined first set of prediction samples; and reconstructing the block based on the prediction samples.

2. The method of claim 1, wherein determining, for each sub-block of the one or more sub-blocks of the plurality of sub-blocks, respective distortion values comprises:

for a second sub-block of the one or more sub-blocks, determining a second distortion value of the respective distortion values, wherein determining between applying per-pixel BDOF and bypassing BDOF for each sub-block of the one or more sub-blocks of the plurality of sub-blocks based on the respective distortion values comprises:

for the second sub-block of the plurality of sub-blocks, determining that BDOF is to be bypassed based on the second distortion value; and based on the determination that BDOF is to be bypassed for the second block, bypassing determining per-pixel motion refinement for refining a second set of prediction samples for the second sub-block, and wherein determining the prediction samples for each sub-block of the one or more sub-blocks based on the determination between applying per-pixel BDOF and bypassing BDOF comprises:

for the second sub-block, determining the second set of prediction samples without refining the second set of prediction samples based on the per-pixel motion refinement for refining the second set of prediction samples.

3. The method of claim 1, the method further comprising determining, for each sample in the first sub-block, respective motion refinements, and wherein determining the prediction samples for the first sub-block comprises determining, for each sample in the first sub-block, respective refined sample values from samples in a prediction block for the first sub-block based on the respective motion refinements to generate the refined first set of prediction samples.

4. The method of claim 1, further comprising:

multiplying a width of a second sub-block of the one or more sub-blocks, a height of the second sub-block of the one or more sub-blocks, and a first scale factor to generate an intermediate value;

performing a left-shift operation on the intermediate value based on a second scale factor to generate a threshold value; and comparing a distortion value of the respective distortion values for the second sub-block with the threshold value, wherein determining between applying per-pixel BDOF and bypassing BDOF for each sub-block of the one or more sub-blocks of the plurality of sub-blocks based on the respective distortion values comprises determining between applying per-pixel BDOF and bypassing BDOF for the second sub-block based on the comparison.

5. The method of claim 1, wherein reconstructing the block comprises:

receiving residual values indicative of a difference between the prediction samples and samples of the block; and adding the residual values to the prediction samples to reconstruct the block.

6. A device for decoding video data, the device comprising:

memory configured to store the video data; and processing circuitry coupled to the memory and configured to:

determine that block-level bi-directional optical flow (BDOF) is enabled for a block of the video data;

divide the block into a plurality of sub-blocks based on the determination that block-level BDOF is enabled for the block;

determine a first set of sample values in a first reference block for a first sub-block of the plurality of sub-blocks;

scale the first set of sample values with a scale factor to generate a first set of scaled sample values;

determine a second set of sample values in a second reference block for the first sub-block of the plurality of sub-blocks;

scale the second set of sample values with the scale factor to generate a second set of scaled sample values;

determine, for each sub-block of one or more sub-blocks of the plurality of sub-blocks, respective distortion values, wherein to determine, for each sub-block of the one or more sub-blocks of the plurality of sub-blocks, the respective distortion values, the processing circuitry is configured to determine, for the first sub-block, a first distortion value of the respective distortion values based on the first set of scaled sample values and the second set of scaled sample values;

determine, for each sub-block of the one or more sub-blocks of the plurality of sub-blocks and based on the respective distortion values, between applying per-pixel BDOF and bypassing BDOF, wherein a process of applying, based on a determination to apply per-pixel BDOF to a sub-block of the one or more sub-blocks, per-pixel BDOF comprises applying a first motion refinement vector to a first pixel in the sub-block and applying a second motion refinement vector applied to a second pixel in the sub-block where the first motion refinement vector and the second motion refinement vector are different, wherein to determine between applying per-pixel BDOF and bypassing BDOF for each sub-block of the one or more sub-blocks of the plurality of sub-blocks based on the respective distortion values, the processing circuitry is configured to determine that per-pixel BDOF is to be applied for the first sub-block based on the first distortion value;

determine prediction samples for each sub-block of the one or more sub-blocks based on the determination between applying per-pixel BDOF and bypassing BDOF, wherein to determine prediction samples, the processing circuitry is configured to, for the first sub-block, reuse the first set of scaled sample values and the second set of scaled sample values for determining per-pixel motion refinement for per-pixel BDOF for refining a first set of prediction samples for the first sub-block to generate a refined first set of prediction samples, and determine the prediction samples for the first sub-block based on the refined first set of prediction samples; and reconstruct the block based on the prediction samples.

7. The device of claim 6, wherein to determine, for each sub-block of the one or more sub-blocks of the plurality of sub-blocks, respective distortion values, the processing circuitry is configured to:

for a second sub-block of the one or more sub-blocks, determine a second distortion value of the respective distortion values, wherein to determine between applying per-pixel BDOF and bypassing BDOF for each sub-block of the one or more sub-blocks of the plurality of sub-blocks based on the respective distortion values, the processing circuitry is configured to:

for the second sub-block of the plurality of sub-blocks, determine that BDOF is to be bypassed based on the second distortion value; and based on the determination that BDOF is to be bypassed for the second block, bypass determining per-pixel motion refinement for refining a second set of prediction samples for the second sub-block, and wherein to determine the prediction samples for each sub-block of the one or more sub-blocks based on the determination between applying per-pixel BDOF and bypassing BDOF, the processing circuitry is configured to:

for the second sub-block, determine the second set of prediction samples without refining the second set of prediction samples based on the per-pixel motion refinement for refining the second set of prediction samples.

8. The device of claim 6, wherein the processing circuitry is further configured to determine, for each sample in the first sub-block, respective motion refinements, and wherein to determine the prediction samples for the first sub-block, the processing circuitry is configured to determine, for each sample in the first sub-block, respective refined sample values from samples in a prediction block for the first sub-block based on the respective motion refinements to generate the refined first set of prediction samples.

9. The device of claim 6, wherein the processing circuitry is configured to:

multiply a width of a second sub-block of the one or more sub-blocks, a height of the second sub-block of the one or more sub-blocks, and a first scale factor to generate an intermediate value;

perform a left-shift operation on the intermediate value based on a second scale factor to generate a threshold value; and compare a distortion value of the respective distortion values for the second sub-block with the threshold value, wherein to determine between applying per-pixel BDOF and bypassing BDOF for each sub-block of the one or more sub-blocks of the plurality of sub-blocks based on the respective distortion values, the processing circuitry is configured to determine between applying per-pixel BDOF and bypassing BDOF for the second sub-block based on the comparison.

10. The device of claim 6, wherein to reconstruct the block, the processing circuitry is configured to:

receive residual values indicative of a difference between the prediction samples and samples of the block; and add the residual values to the prediction samples to reconstruct the block.

11. The device of claim 6, further comprising a display configured to display decoded video data.

12. The device of claim 6, wherein the device comprises one or more of a camera, a computer, a mobile device, a broadcast receiver device, or a set-top box.

13. A non-transitory computer-readable storage medium storing instructions thereon that when executed cause one or more processors to:

determine that block-level bi-directional optical flow (BDOF) is enabled for a block of video data;

divide the block into a plurality of sub-blocks based on the determination that block-level BDOF is enabled for the block;

determine a first set of sample values in a first reference block for a first sub-block of the plurality of sub-blocks;

scale the first set of sample values with a scale factor to generate a first set of scaled sample values;

determine a second set of sample values in a second reference block for the first sub-block of the plurality of sub-blocks;

scale the second set of sample values with the scale factor to generate a second set of scaled sample values;

determine, for each sub-block of one or more sub-blocks of the plurality of sub-blocks, respective distortion values, wherein the instructions that cause the one or more processors to determine, for each sub-block of the one or more sub-blocks of the plurality of sub-blocks, the respective distortion values comprise instructions that cause the one or more processors to determine, for the first sub-block, a first distortion value of the respective distortion values based on the first set of scaled sample values and the second set of scaled sample values;

determine, for each sub-block of the one or more sub-blocks of the plurality of sub-blocks and based on the respective distortion values, between applying per-pixel BDOF and bypassing BDOF, wherein a process of applying, based on a determination to apply per-pixel BDOF to a sub-block of the one or more sub-blocks, per-pixel BDOF comprises applying a first motion refinement vector to a first pixel in the sub-block and applying a second motion refinement vector to a second pixel in the sub-block where the first motion refinement vector and the second motion refinement vector are different, wherein the instructions that cause the one or more processors to determine between applying per-pixel BDOF and bypassing BDOF for each sub-block of the one or more sub-blocks of the plurality of sub-blocks based on the respective distortion values comprise instructions that cause the one or more processors to determine that per-pixel BDOF is to be applied for the first sub-block based on the first distortion value;

determine prediction samples for each sub-block of the one or more sub-blocks based on the determination between applying per-pixel BDOF and bypassing BDOF, wherein the instructions that cause the one or more processors to determine prediction samples comprise instructions that cause the one or more processors to, for the first sub-block, reuse the first set of scaled sample values and the second set of scaled sample values for determining per-pixel motion refinement for per-pixel BDOF for refining a first set of prediction samples for the first sub-block to generate a refined first set of prediction samples, and determine the prediction samples for the first sub-block based on the refined first set of prediction samples; and reconstruct the block based on the prediction samples.

14. The non-transitory computer-readable storage medium of claim 13, wherein the instructions that cause the one or more processors to determine, for each sub-block of the one or more sub-blocks of the plurality of sub-blocks, respective distortion values comprise instructions that cause the one or more processors to:

for a second sub-block of the one or more sub-blocks, determine a second distortion value of the respective distortion values, wherein the instructions that cause the one or more processors to determine between applying per-pixel BDOF and bypassing BDOF for each sub-block of the one or more sub-blocks of the plurality of sub-blocks based on the respective distortion values comprise instructions that cause the one or more processors to:

for the second sub-block of the plurality of sub-blocks, determine that BDOF is to be bypassed based on the second distortion value; and based on the determination that BDOF is to be bypassed for the second block, bypass determining per-pixel motion refinement for refining a second set of prediction samples for the second sub-block, and wherein the instructions that cause the one or more processors to determine the prediction samples for each sub-block of the one or more sub-blocks based on the determination between applying per-pixel BDOF and bypassing BDOF comprise instructions that cause the one or more processors to:

for the second sub-block, determine the second set of prediction samples without refining the second set of prediction samples based on the per-pixel motion refinement for refining the second set of prediction samples.

15. The non-transitory computer-readable storage medium of claim 13, the instructions further comprising instructions that cause the one or more processors to determine, for each sample in the first sub-block, respective motion refinements, and wherein the instructions that cause the one or more processors to determine the prediction samples for the first sub-block comprise instructions that cause the one or more processors to determine, for each sample in the first sub-block, respective refined sample values from samples in a prediction block for the first sub-block based on the respective motion refinements to generate the refined first set of prediction samples.

16. The non-transitory computer-readable storage medium of claim 13, further comprising instructions that cause the one or more processors to:

multiply a width of a second sub-block of the one or more sub-blocks, a height of the second sub-block of the one or more sub-blocks, and a first scale factor to generate an intermediate value;

perform a left-shift operation on the intermediate value based on a second scale factor to generate a threshold value; and compare a distortion value of the respective distortion values for the first sub-block with the threshold value, wherein the instructions that cause the one or more processors to determine between applying per-pixel BDOF and bypassing BDOF for each sub-block of the one or more sub-blocks of the plurality of sub-blocks based on the respective distortion values comprise instructions that cause the one or more processors to determine between applying per-pixel BDOF and bypassing BDOF for the second sub-block based on the comparison.

17. A device for encoding video data, the device comprising:

memory configured to store the video data; and processing circuitry coupled to the memory and configured to:

determine that block-level bi-directional optical flow (BDOF) is enabled for a block of the video data;

divide the block into a plurality of sub-blocks based on the determination that block-level BDOF is enabled for the block;

determine a first set of sample values in a first reference block for a first sub-block of the plurality of sub-blocks;

scale the first set of sample values with a scale factor to generate a first set of scaled sample values;

determine a second set of sample values in a second reference block for the first sub-block of the plurality of sub-blocks;

scale the second set of sample values with the scale factor to generate a second set of scaled sample values;

determine, for each sub-block of one or more sub-blocks of the plurality of sub-blocks, respective distortion values, wherein to determine, for each sub-block of the one or more sub-blocks of the plurality of sub-blocks, the respective distortion values, the processing circuitry is configured to determine, for the first sub-block, a first distortion value of the respective distortion values based on the first set of scaled sample values and the second set of scaled sample values;

determine, for each sub-block of the one or more sub-blocks of the plurality of sub-blocks and based on the respective distortion values, between applying per-pixel BDOF and bypassing BDOF, wherein an operation of applying, based on a determination to apply per-pixel BDOF to a sub-block of the one or more sub-blocks, per-pixel BDOF comprises applying a first motion refinement vector to a first pixel in the sub-block and applying a second motion refinement vector to a second pixel in the sub-block where the first motion refinement vector and the second motion refinement vector are different, wherein to determine between applying per-pixel BDOF and bypassing BDOF for each sub-block of the one or more sub-blocks of the plurality of sub-blocks based on the respective distortion values, the processing circuitry is configured to determine that per-pixel BDOF is to be applied for the first sub-block based on the first distortion value;

determine prediction samples for each sub-block of the one or more sub-blocks based on the determination between applying per-pixel BDOF and bypassing BDOF, wherein to determine prediction samples, the processing circuitry is configured to, for the first sub-block, reuse the first set of scaled sample values and the second set of scaled sample values for determining per-pixel motion refinement for per-pixel BDOF for refining a first set of prediction samples for the first sub-block to generate a refined first set of prediction samples, and determine the prediction samples for the first sub-block based on the refined first set of prediction samples; and encode the block based on the prediction samples.

18. The device of claim 17, wherein to determine, for each sub-block of the one or more sub-blocks of the plurality of sub-blocks, respective distortion values, the processing circuitry is configured to:

for a second sub-block of the one or more sub-blocks, determine a second distortion value of the respective distortion values, wherein to determine between applying per-pixel BDOF and bypassing BDOF for each sub-block of the one or more sub-blocks of the plurality of sub-blocks based on the respective distortion values, the processing circuitry is configured to:

for the second sub-block of the plurality of sub-blocks, determine that BDOF is to be bypassed based on the second distortion value; and based on the determination that BDOF is to be bypassed for the second block, bypass determining per-pixel motion refinement for refining a second set of prediction samples for the second sub-block, and wherein to determine the prediction samples for each sub-block of the one or more sub-blocks based on the determination between applying per-pixel BDOF and bypassing BDOF, the processing circuitry is configured to:

for the second sub-block, determine the second set of prediction samples without refining the second set of prediction samples based on the per-pixel motion refinement for refining the second set of prediction samples.

19. The device of claim 17, wherein the processing circuitry is further configured to determine, for each sample in the first sub-block, respective motion refinements, and wherein to determine the prediction samples for the first sub-block, the processing circuitry is configured to determine, for each sample in the first sub-block, respective refined sample values from samples in a prediction block for the first sub-block based on the respective motion refinements to generate the refined first set of prediction samples.

20. The device of claim 17, wherein the processing circuitry is configured to:

multiply a width of a second sub-block of the one or more sub-blocks, a height of the second sub-block of the one or more sub-blocks, and a first scale factor to generate an intermediate value;

perform a left-shift operation on the intermediate value based on a second scale factor to generate a threshold value; and compare a distortion value of the respective distortion values for the second sub-block with the threshold value, wherein to determine between applying per-pixel BDOF and bypassing BDOF for each sub-block of the one or more sub-blocks of the plurality of sub-blocks based on the respective distortion values, the processing circuitry is configured to determine between applying per-pixel BDOF and bypassing BDOF for the second sub-block based on the comparison.

* * * * *